US012743416B2

(12) United States Patent
Atreya V et al.

(10) Patent No.: US 12,743,416 B2
(45) Date of Patent: Sep. 22, 2026

(54) QUERY RESPONSE GENERATION BY INTEGRATING ADAPTIVE RETRIEVAL-AUGMENTED GENERATION WITH LARGE LANGUAGE MODEL

(71) Applicant: Accenture Global Solutions Limited, Dublin (IE)

(72) Inventors: Arjun Atreya V, Bengaluru (IN); Krishna Kummamuru, Bengaluru (IN); Inderjeet Singh, Bengaluru (IN)

(73) Assignee: Accenture Global Solutions Limited, Dublin (IE)

( * ) Notice: Subject to any disclaimer, the term of this patent is extended or adjusted under 35 U.S.C. 154(b) by 5 days.

(21) Appl. No.: 19/005,228

(22) Filed: Dec. 30, 2024

(65) Prior Publication Data

US 2026/0187056 A1 Jul. 2, 2026

(51) Int. Cl.
*G06F 16/242* (2019.01)
*G06F 16/2452* (2019.01)

(52) U.S. Cl.
CPC ........ *G06F 16/243* (2019.01); *G06F 16/2452* (2019.01)

(58) Field of Classification Search
CPC ........................... G06F 16/243; G06F 16/2452
USPC ........................................................ 707/760
See application file for complete search history.

(56) References Cited

U.S. PATENT DOCUMENTS 7,885,968 B1 * 2/2011 Hamamatsu ........ G06F 16/2452 707/760
2024/0256622 A1 * 8/2024 Abrams .............. G06F 16/9538
2025/0045518 A1 * 2/2025 Barta ..................... G06F 40/186
2025/0078969 A1 * 3/2025 Low ........................ G16H 10/20
2025/0384332 A1 * 12/2025 Boué ................. G06F 16/90335
2026/0023987 A1 * 1/2026 Curic ...................... G06N 5/022
2026/0065075 A1 * 3/2026 Gofman ............... G06N 3/0985
2026/0073000 A1 * 3/2026 Guo .................... G06F 16/9566

OTHER PUBLICATIONS

Prasanth Sai "The Ultimate Guide on Retrieval Strategies—RAG (part-4)" ChatGen.ai, Dec. 28, 2023 (6 Pages).

(Continued)

*Primary Examiner* — Cam Linh T Nguyen
(74) *Attorney, Agent, or Firm* — Seed Intellectual Property Law Group LLP

(57) ABSTRACT

Methods and systems for generating a query response are disclosed. A query is received for generating a query response using a Large Language Model (LLM). Based upon a type of question to be answered for the query, the query may be translated and routed to a database to identify relevant results. Based upon the relevant results retrieved from the database, a first completion response is generated using the LLM. Based upon a predetermined set of parameters, the first completion response is evaluated to identify quality of the first completion response. When the evaluation of the first completion response indicates that the quality of the first completion response fails to satisfy criteria indicated by the predetermined set of parameters, an action change and/or a configuration change are determined to generate a second completion response that satisfies criteria indicated by the predetermined set of parameters.

20 Claims, 10 Drawing Sheets

(56) References Cited

OTHER PUBLICATIONS

Guoying Sun et al. "Text classification with improved word embedding and adaptive segmentation" Expert Systems with Applications vol. 238, Part B, Mar. 15, 2024 (9 Pages).
Carlo C. "Chunking strategies for more effective RAG through LLM" AI monks.io, Nov. 15, 2023 (4 Pages).

* cited by examiner

QUERY RESPONSE GENERATION BY INTEGRATING ADAPTIVE RETRIEVAL-AUGMENTED GENERATION WITH LARGE LANGUAGE MODEL

TECHNICAL FIELD

Various examples described herein relate generally to method, system, and computer program product for generating query responses by integrating adaptive Retrieval-Augmented Generation (RAG) with a Large Language Model (LLM).

BACKGROUND

Artificial Intelligence (AI) finds implementations in different use cases in the context of data processing. In the field of AI, Generative AI (GAI) has recently seen an explosion in popularity. GAI includes Large Language Models (LLMs), which may be used to generate responses for a variety of use cases based on training data (e.g., including a large corpus of data). In some examples, the LLMs may be integrated in digital assistants (e.g., chatbots) replacing traditional rule-based systems to generate the responses to queries received from a user. However, the LLMs may be often limited to the training data for generating the responses and retraining of the LLMs based on additional data may be computationally intensive. To overcome such limitations of the LLMs, Retrieval-Augmented Generation (RAG) may be employed to augment the LLMs with the additional data such as domain-specific data. Therefore, using RAG, the LLMs may query for the additional data that the LLMs have not been previously trained on.

In general, RAG may include receiving a query, retrieving domain-specific data that is relevant to the query, and using the domain-specific data as context for the query when prompting an LLM. In this manner, domain-related knowledge gaps of the LLMs may be mitigated and responses from the LLMs may include the most up-to-date data relevant to a respective domain.

SUMMARY

Implementations of the present disclosure provide an adaptive Retrieval-Augmented Generation (RAG), which enables dynamic determination of an action change and/or a configuration change for a RAG query pipeline to generate a query response corresponding to a query using a Large Language Model (LLM). Therefore, accuracy or quality of the query response may be improved, while reducing computing resource requirements, time, and cost associated with generating the query response.

In at least one example, the present disclosure provides a computer-implemented method for adaptive RAG. The method includes receiving a query for generating a query response using an LLM. The method includes determining a type of question to be answered for the query. Based upon the type of question to be answered, the method includes translating the query. The method includes routing the query to a database to identify a preconfigured number of relevant results. The preconfigured number of relevant results and the database are selected based upon the type of question to be answered. Based upon the preconfigured number of relevant results retrieved from the database, the method includes generating a first completion response using the LLM. The method includes evaluating, based upon a predetermined set of parameters, the first completion response to identify quality of the first completion response. When the evaluation of the first completion response indicates that the quality of the first completion response fails to satisfy criteria indicated by the predetermined set of parameters, the method includes determining an action change and/or a configuration change to generate a second completion response that satisfies criteria indicated by the predetermined set of parameters.

The present disclosure further describes a system for implementing the method provided herein. The present disclosure also describes a non-transitory computer-readable storage media (CRM) having instructions stored thereon which, when executed by one or more processors of a computing device, cause the computing device to perform operations in accordance with the method described herein.

It is appreciated that method in accordance with the present disclosure can include any combination of the aspects and features described herein. That is, the method in accordance with the present disclosure is not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF THE DRAWINGS

Various examples in accordance with the present disclosure will be described with reference to the drawings, in which.

Like reference numbers and designations in the various drawings indicate like elements.

DETAILED DESCRIPTION

Figure 1:
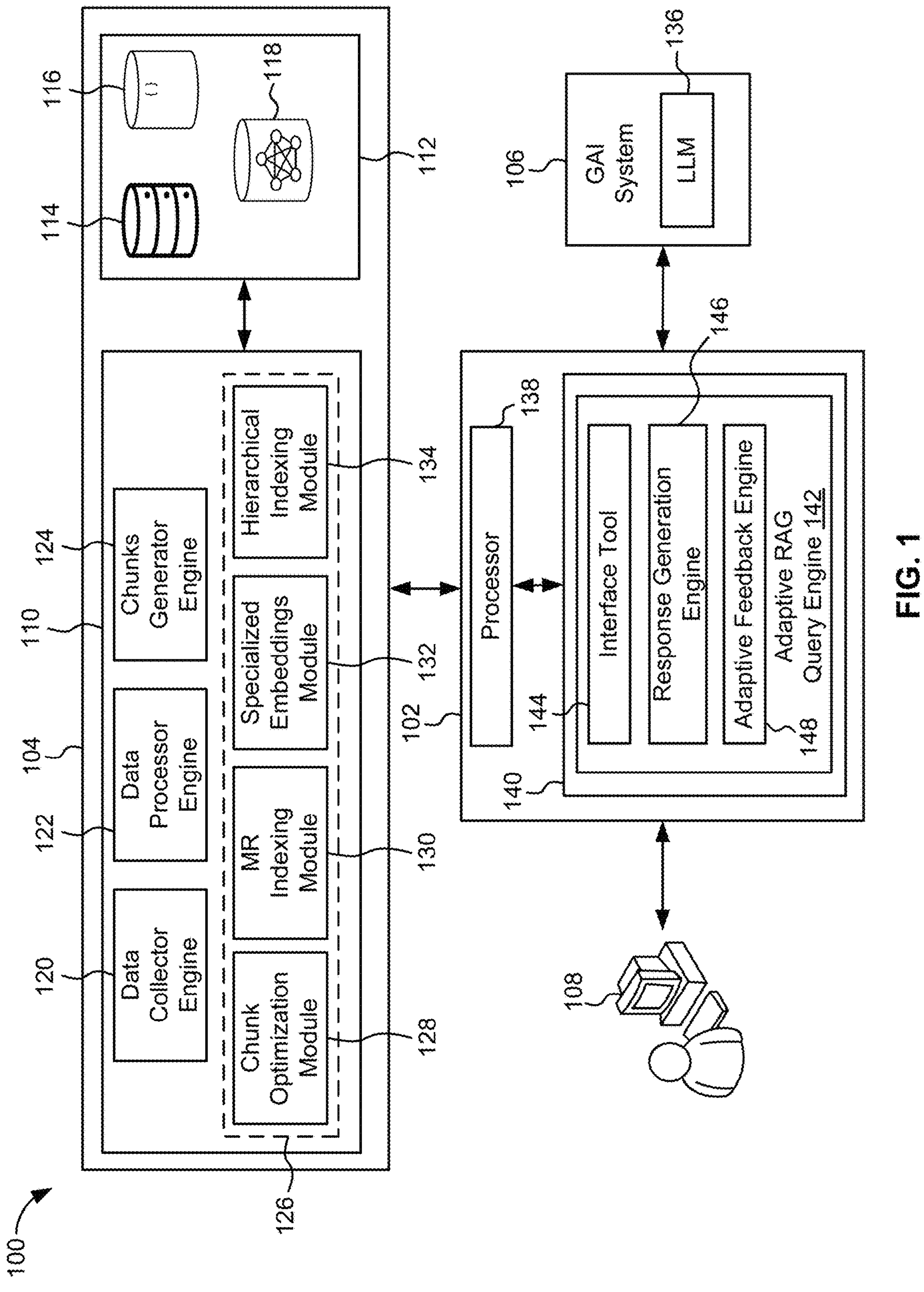
FIG. 1 depicts an example adaptive Retrieval-Augmented Generation (RAG) environment for generating query responses for queries by integrating adaptive RAG with a Large Language Model (LLM), in accordance with implementations of the present disclosure.

In the following description, various examples will be illustrated by way of example and not by way of limitation in the figures of the accompanying drawings. References to various examples in this disclosure are not necessarily to the same example, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Reference to any "example" herein (e.g., "for example," "an example of," by way of example," or the like) are to be considered non-limiting examples regardless of whether expressly stated or not.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various examples given in this specification.

Without intent to limit the scope of the disclosure, examples of instruments, apparatus, methods, and their related results according to the examples of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

The term "comprising" when utilized means "including, but not necessarily limited to"; it specifically indicates open-ended inclusion or membership in the so-described combination, group, series, and the like.

The term "a" means "one or more" unless the context clearly indicates a single element.

"First," "second," etc., are labels to distinguish components or blocks of otherwise similar names but does not imply any sequence or numerical limitation.

"And/or" for two possibilities means either or both of the stated possibilities ("A and/or B" covers A alone, B alone, or both A and B take together), and when present with three or more stated possibilities means any individual possibility alone, all possibilities taken together, or some combination of possibilities that is less than all of the possibilities. The language in the format "at least one of A . . . and N" where A through N are possibilities means "and/or" for the stated possibilities (e.g., at least one A, at least one N, at least one A and at least one N, etc.).

It should also be noted that in some alternative implementations, the functions/acts noted may occur out of the order noted in the figures. For example, two steps disclosed or shown in succession may in fact be executed substantially concurrently or may sometimes be executed in the reverse order, depending upon the functionality or acts involved.

Specific details are provided in the following description to provide a thorough understanding of examples. However, it will be understood by one of ordinary skill in the art that examples may be practiced without these specific details. For example, systems may be shown in block diagrams so as not to obscure the examples in unnecessary detail. In other instances, well-known processes, structures, and techniques may be shown without unnecessary detail in order to avoid obscuring example examples.

The specification and drawings are to be regarded in an illustrative rather than a restrictive sense. It will, however, be evident that various modifications and changes may be made thereunto without departing from the broader spirit and scope as set forth in the claims.

With the advent of Generative Artificial Intelligence (GAI) systems, enterprises are adopting the GAI systems to support execution of various tasks or processes. For example, a GAI system may support communications and interactions, and processes in software systems to support decision-making within the enterprises. Multiple applications within an enterprise network environment may use and interact with foundation models or Large Language Models (LLMs) of the GAI systems to provide input and/or data for execution of a wide variety of tasks such as, human computer interactions (e.g., question and answering), automating process execution, process planning, generating step-by-step procedures for the process execution, performing data analysis, and/or the like. Therefore, the LLMs have capability of Natural Language Processing (NLP) related tasks and processing unstructured data. Due to the LLM's capability of processing the unstructured data, the LLMs may be implemented for various domains and applications such as, software engineering, computational biology, healthcare or medicine, marketing, and/or the like.

A LLM may be trained based on diverse range of datasets to generate responses for queries received from a user. The responses may indicate outcomes or results of the variety of tasks performed in the various domains and applications. Further, to obtain specific responses from execution of specific customized tasks, the LLM may be required to be fine-tuned or retrained based on a specific customized dataset. For example, to obtain a manual of a car A related to a company A, the LLM may be fine-tuned or retrained based on a dataset including all documents related to the car A. Therefore, it may be challenging to obtain the specific responses related to the specific customized tasks, without fine-tuning or retraining of the LLM. However, fine-tuning or retraining of the LLM may be computationally intensive task. Therefore, known systems may employ Retrieval-Augmented Generation (RAG) for generating the specific responses. RAG may augment the LLM with external sources of knowledge (e.g., domain specific data) to generate the specific responses, without requiring fine-tuning or retraining of the LLM.

With the integration of RAG into the LLM, a known system may employ a RAG query pipeline for generating a response. The RAG query pipeline may include multiple modules for generating the response using the LLM. For example, the multiple modules may include, a query processing module, a query embedding module, a search indexing module, a results retrieval module, and a response generation module. Each of the multiple modules may have sub-modules and different configurations. The query processing module may perform processing of the query. Processing of the query may include query construction, query translation, and query routing. The query embedding module may convert the query into embeddings or a vector representation for further processing.

The search indexing module may perform a search on a database to determine relevant results for the query in the database. The search indexing module may perform the search based on hierarchical index levels. However, in the known system, the hierarchical index levels may be tightly coupled by retaining a relation between child and parent index levels. For example, in the known system, if relevant results assigned with a low-level index (e.g., a sentence level index) are determined for the query, then results associated with the determined relevant results and assigned with a high-level index (e.g., a document level index) may be retrieved for generating the response for the query. Such a retrieval process may not represent an appropriate similarity between the query and the retrieved results. Therefore, a probability of generating the response including a complete answer may be low. In addition, updating one of the index levels may lead to creation of the index levels all over again. Therefore, maintaining the hierarchical index levels by retaining the relation between the child and parent indices may be expensive and pose various challenges.

The results retrieval module may retrieve the determined relevant results from the database and aggregate the retrieved relevant results. The aggregated relevant results may provide domain-specific data or context relevant to the query. The response generation module may pass the query and the aggregated relevant results to the LLM to generate the response. Therefore, the response may be generated by synthesizing specific information captured from the retrieved relevant results, which may ensure that the response is not only generated based on the trained data of the LLM but also the response is augmented with the specific information captured from the retrieved relevant results.

The known system may set up the RAG query pipeline for a use case or domain. Setting up the RAG query pipeline may include selecting one or more modules from the multiple modules and selecting configurations for each of the selected one or more modules. For example, for a domain like, industrial equipment, the known system may set up the RAG query pipeline by selecting the modules such as, the query processing module, the query embedding module, the search indexing module, the results retrieval module, and the response generation module. The known system may select configurations for the search indexing module to perform knowledge indexing based on a semantic search, which includes performing the semantic search on the database including a vector database to determine the relevant results for the query in the vector database.

Once the RAG query pipeline is set up, the RAG query pipeline may be used for all queries related to the respective use case or domain, irrespective of types or dynamics of the queries. Therefore, the RAG query pipeline may be static or fixed for all the queries of the respective use case or domain. However, the static or fixed RAG query pipeline may not be efficient for all the types of queries. To illustrate, the static or fixed RAG query pipeline may be efficient for generating a response corresponding to a query including a complex question like "what will be the changes to insurance premium amount after filing a car theft claim." However, the static or fixed RAG query pipeline may not be efficient for generating a response corresponding to a query including a generic or simple question like "what is endowment policy", as processing of such a question does not require execution of all the modules except the query processing module and the response generation module and does not require routing of the query to multiple databases to generate a complex and multi-configuration response. Therefore, the fixed RAG query pipeline may result in a complex RAG query pipeline for queries including generic or simple question. Further, responses generated for such queries may have low accuracy, as the responses may be noisy (e.g., includes irrelevant information along with relevant information).

Also, the known system may fail to employ an auto correction feedback loop to refine the response generated using the static or fixed RAG query pipeline. Therefore, the known system may require explicit user inputs or feedback for refining the response in terms of completeness, correctness, inconsistency, and/or the like. However, multiple contrasting user inputs or feedback may lead to an inconsistent response.

In addition, the static or fixed RAG query pipeline may not be customized according to requirements of entities (e.g., organizations, enterprises, and/or the like), as it may be difficult to maintain a structure of the static or fixed RAG query pipeline. For example, if the RAG query pipeline is fixed or customized in accordance with requirements of an entity 1, then the same RAG query pipeline may be required to use for other entities without being customized.

Therefore, due to the static or fixed RAG query pipeline, the known system may require a significant amount of time, human resources, and computing resources (e.g., processing resources, memory resources, communication resources, and/or the like) for processing the queries.

Implementations of the present disclosure enable generation of responses for respective queries by integrating adaptive RAG into the LLM. Adaptive RAG may provide a flexibility to set up a dynamic RAG pipeline for generation of a response for a query. The dynamic RAG pipeline may enable selective selection of one or more modules and configurations for each of the selected one or more modules for generation of each of one or more completion responses for the query. Among the one or more completion responses, a completion response that satisfies a predetermined set of parameters may be determined as the response for the query. Therefore, the response may be generated for the query with improved accuracy or quality and with reduced time, cost, and computing resource requirements. In addition, the generated response may be more relevant to the query and/or may match expectations of a user.

FIG. 1 depicts an example adaptive Retrieval-Augmented Generation (RAG) environment 100 for generating query responses for queries, in accordance with implementations of the present disclosure. The example adaptive RAG environment 100 includes a system 102, a data ingestion system 104, a Generative Artificial Intelligence (GAI) system 106, and a user device 108. In the present disclosure, the system 102 may also be referenced to as a computing device, an adaptive RAG system, and/or the like. The system 102 may communicate with the data ingestion system 104, the GAI system 106, and the user device 108 using a network (not shown in FIG. 1). In some examples, the network may include a Local Area Network (LAN), a Wide Area Network (WAN), the Internet, or a combination thereof. In some examples, the network may be accessed over a wired and/or a wireless communication link. It should be noted that in some implementations, the system 102 may include the data ingestion system 104 and/or the user device 108.

The data ingestion system 104 includes a data ingestor 110 and a database 112. The data ingestor 110 may collect, process, and store data in the database. In some examples, the database 112 may include one or more of: a relational database 114, a vector database 116, and a graph database 118. The relational database 114 may store and organize data in predefined relationships. The vector database 116 may store the data in vector representation or embeddings. The graph database 118 may use graph structures for semantic queries with nodes, edges, and properties to represent and store the data. The data ingestor 110 includes a data collector engine 120, a data processor engine 122, a chunks generator engine 124, and an indexing engine 126.

The data collector engine 120 may collect the data from various data sources (not shown in FIG. 1). The data may be related to various domains. In some examples, the domains may include use cases or applications, which require implementation of the GAI system 106 to perform one or more tasks (e.g., question and answering). Examples of the domains may include, but are not limited to, software development, healthcare, retail industries (including enterprise applications), industrial equipment, or any domain that require the GAI system 106 to perform data processing on exponentially increasing data, while improving efficiency, enhanced decision-making, and actionable operations insights. In some examples, the data may include multiple documents.

Upon collecting the data, the data processor engine 122 may preprocess the data. In some examples, the data may be preprocessed by applying data cleaning techniques on the data to remove irrelevant data. Therefore, preprocessing of the data may ensure that the data is clean, structured, and free from noise (e.g., irrelevant data). The data processor engine 122 may also generate metadata and summaries for the data. The metadata and summaries may act as reference points for the data, so that the data may be accessed more accurately while improving retrieval time of the data.

The chunks generator engine 124 may convert the data into multiple chunks. The multiple chunks may represent smaller text segments of the data. In the present disclosure, chunks may also be referenced to as text segments. In some examples, the data may be converted into the multiple chunks using chunking techniques such as, but are not limited to, fixed length chunking, sentence-level chunking, paragraph-level chunking, document-level chunking, semantic chunking, characters level chunking, sections level chunking, content-aware chunking, recursive chunking, delimiter, and/or the like.

Once the data is converted into the multiple chunks, the indexing engine 126 may index the chunks, thereby indexing the data. The indexing engine 126 includes a chunk optimization module 128, a multi-representation (MR) indexing module 130, a specialized embeddings module 132, and a hierarchical indexing module 134. The chunk optimization module 128 may optimize size and structure of each of the multiple chunks to balance context preservation. Therefore, it may be ensured that the multiple chunks are neither too large nor too small. The multi-representation indexing module 130 may transform the data into summaries (e.g., compact retrieval units). The specialized embeddings module 132 may embed fine-tuning to refine an embedding model, which may be used to convert the chunks into vector representations or embeddings. The hierarchical indexing module 134 may index the data by assigning hierarchical index levels (also be referenced to as hierarchical indices) for the multiple chunks. Therefore, the data may be structured into multiple abstraction levels of aggregation. In some examples, the hierarchical index levels may include a sentence level index, a paragraph level index, a page level index, a section level index, a document level index, and/or the like. In the present disclosure, the hierarchical index levels may not be connected with each other, thereby the hierarchical index levels are independent index levels. The indexed data may be stored in the database 112.

The GAI system 106 may include a Large Language Model (LLM) 136. In the present disclosure, the LLM 136 may also be referenced to as a foundation model, a GAI model, and/or the like. Also, for simplicity, the GAI system 106 including the LLM 136 is depicted in FIG. 1, however it should be noted that the GAI system 106 may include one or more LLMs. The LLM 136 may be a general-purpose GAI model like a large deep learning neural network, which may be trained using a broad range of generalized and unlabeled training data to perform the one or more tasks such as, human computer interactions (e.g., question and answering), automating process execution, process planning, generating step-by-step procedures for the process execution, performing data analysis, and/or the like. While implementations of the present disclosure are described in further detail herein with non-limiting reference to the LLM 136, it is contemplated that implementations of the present disclosure may be realized using any appropriate foundation models or Machine Learning (ML) models, or Artificial Intelligence (AI) models.

The user device 108 may be associated with a user. In some examples, the user device 108 may include a desktop, smartphones, laptops, a tablet, and/or the like. The user device 108 may present one or more user interfaces (e.g., Graphical User Interfaces (GUIs)) of a workspace for the user to interact with the system 102. The user device 108 may be used to provide input and/or receive output to/from the system 102. The input may include a query, and the output may include a query response for the query. It should be noted that terms "query response," "response," and "answer" may be used interchangeably throughout the document.

The system 102 may be implemented as an on-premises system that is operated by an enterprise or a third-party engaged in cross-platform interactions and data management. In some examples, the system 102 may be implemented as an off-premises system (for example, cloud or on-demand) that is operated by an enterprise or a third-party on behalf of an enterprise. In some examples, the system 102 may be implemented in a cloud environment. For simplicity, the system 102 depicted in FIG. 1 may be a cloud environment that is intended to represent various forms of servers including a web server, an application server, a proxy server, a network server, a server pool, and/or the like.

In some examples, the system 102 may be implemented by way of a single device or a combination of multiple devices that may be operatively connected or networked together. The system 102 may be implemented in hardware or a suitable combination of hardware and software. The "hardware" may include a combination of discrete components, an integrated circuit, an application-specific integrated circuit, a field-programmable gate array, a digital signal processor, or other suitable hardware. The "software" may include one or more objects, agents, threads, lines of code, subroutines, separate software applications, two or more lines of code, or other suitable software structures operating in one or more software applications.

Still referring to FIG. 1, the system 102 includes a processor 138 and a memory 140 communicably coupled to the processor 138. The processor 138 may include one or more processors. Examples of the processor 138 may include, but are not limited to, microprocessors, microcomputers, microcontrollers, digital signal processors, central processing units, state machines, logic circuits, and/or any devices that manipulate data or signals based on operational instructions. Among other capabilities, the processor 138 may fetch instructions (also be referenced to as processor-executable instructions or machine-executable instructions) from the memory 140 and execute the fetched instructions for performing operations according to the present disclosure. The memory 140 may be non-volatile or non-transitory computer-readable medium (CRM) such as, a magnetic disk or solid-state non-volatile memory or volatile medium such as Random Access Memory (RAM), and/or the like. Further, the system 102 includes an adaptive RAG query engine 142. The adaptive RAG query engine 142 may be stored in the memory 140 and provided as a downloadable library including the instructions. The adaptive RAG query engine 142 includes an interface tool 144, a response generation engine 146, and an adaptive feedback engine 148. The response generation engine 146 and the adaptive feedback engine 148 may include one or more modules, which are described in detail in conjunction with FIG. 2. In the present disclosure, the modules of the response generation engine 146 and the adaptive feedback engine 148 may also be referenced to as components, units, and/or the like.

In an example implementation, the processor 138 may execute the interface tool 144 to receive the query as the input from the user device 108. The query may be for generating the query response using the LLM 136. Also, the processor 138 may execute the interface tool 144 to provide the query response generated for the input as the output to the user device 108.

In an example implementation, the processor 138 may execute the adaptive feedback engine 148 to initially set up a RAG query pipeline for the received query. The RAG query pipeline may indicate the one or more modules of the response generation engine 146 selected to be enabled or switched ON for generating a first completion response for the query and configurations determined for each of the selected one or more modules of the response generation engine 146.

In an example implementation, the processor 138 may execute the response generation engine 146 to generate the first completion response for the query using the RAG query pipeline that has been initially set up for generation of the first completion response. In some examples, the response generation engine 146 may generate the first completion response by determining and retrieving relevant results for the query from the multiple chunks of the different index levels stored in the database 112 (described in detail in conjunction with FIG. 2).

In an example implementation, the processor 138 may also execute the adaptive feedback engine 148 to evaluate the first completion response generated for the query. The adaptive feedback engine 148 may evaluate the first completion response based on a predetermined set of parameters (described in detail in conjunction with FIG. 2) to identify quality of the first completion response. If the quality of the first completion response satisfies criteria indicated by the predetermined set of parameters, the adaptive feedback engine 148 may determine the first completion response as the query response for the query.

If the quality of the first completion response fails to satisfy the criteria indicated by the predetermined set of parameters, the adaptive feedback engine 148 may iteratively perform steps of: modifying the RAG query pipeline, enabling the response generation engine 146 to subsequently generate a completion response using the modified RAG query pipeline, and evaluating the subsequently generated completion response. Therefore, one or more different iterations may be performed to subsequently generate one or more completion responses. Each of the one or more completion responses may be subsequently generated using the respective modified RAG query pipeline. After each iteration, the adaptive feedback engine 148 may dynamically modify the RAG query pipeline for a next iteration, based upon quality of a completion response generated in a respective iteration and/or evolution of the completion response with respect to a previously generated completion response. Therefore, in the present disclosure, the RAG query pipeline becomes dynamic and adaptive to each of the one or more different iterations. The modified RAG query pipeline may indicate a change in selection of the one or more modules of the response generation engine 146 for the next iteration and/or a change in configurations for the selected one or more modules. Further, among the subsequently generated one or more completion responses, the adaptive feedback engine 148 may determine the completion response with the quality satisfying the criteria as the query response for the query. Such a query response may have high accuracy or quality.

Various examples depicting generating the query response for the query using the dynamic RAG query pipeline is described in detail in conjunction with FIGS. 2-8.

Figure 2:
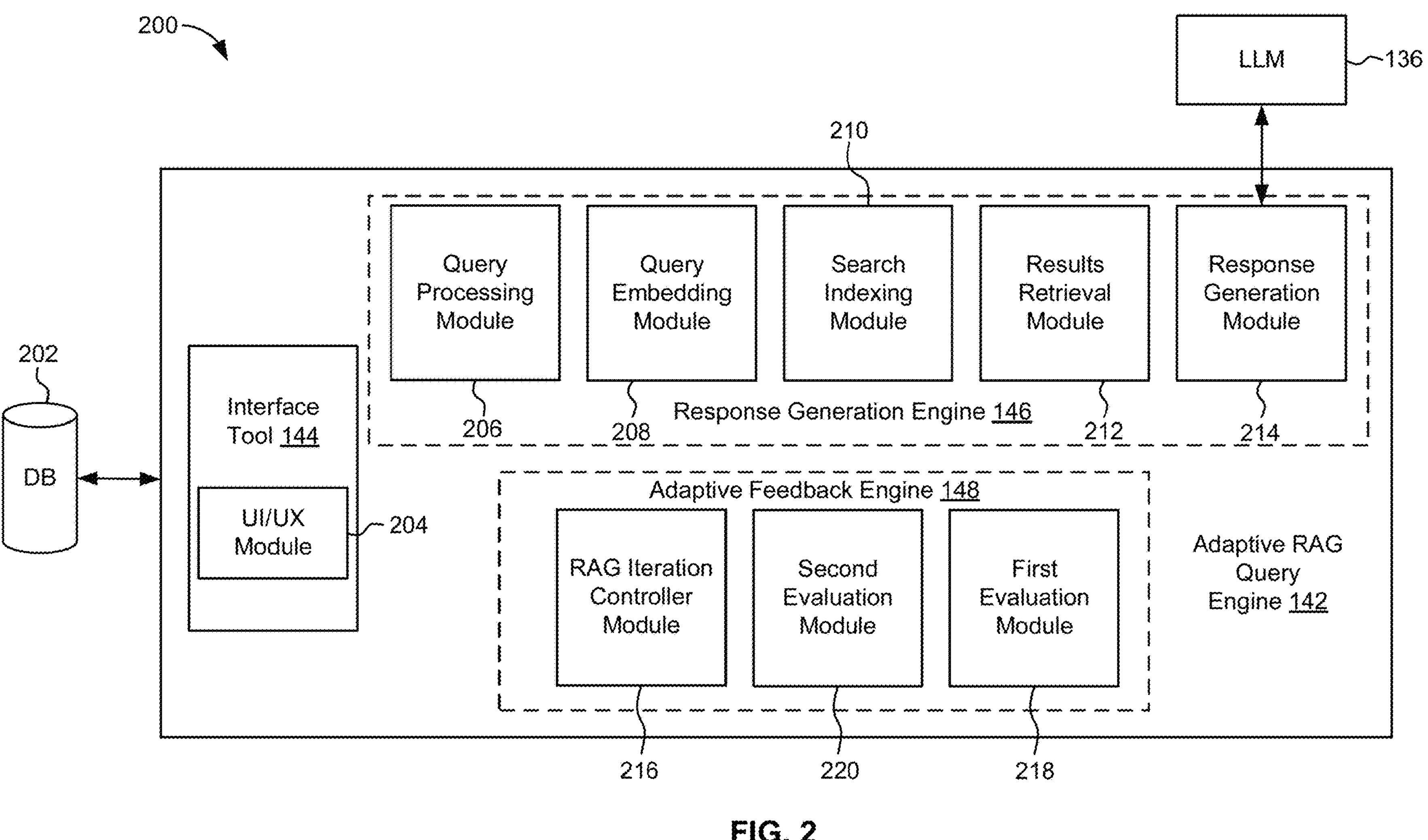
FIG. 2 depicts an example conceptual architecture of an adaptive RAG query engine for generating a query response for a query using a dynamic RAG query pipeline, in accordance with implementations of the present disclosure.

FIG. 2 depicts an example conceptual architecture 200 of the adaptive RAG query engine 142 for generating the query response for the query using the dynamic RAG query pipeline, in accordance with implementations of the present disclosure. In some examples, as depicted in FIG. 2, the adaptive RAG query engine 142 may be communicatively coupled with a database (DB) 202, which may store various data and intermediate results generated by the interface tool 144, the response generation engine 146, and the adaptive feedback engine 148.

The interface tool 144 includes a User Interface or User Experience (UX) module 204. The UI or UX module 204 may represent one or more interfaces or front-end or back-end components of a chatbot that may be executed on the user device 108 (depicted in FIG. 1) to enable receipt of the query and providing the query response to the query. The query may be in a natural language format. The query response for the query may be generated using the response generation engine 146 and the adaptive feedback engine 148. The query and the respective query response may be stored in the database 202.

The response generation engine 146 includes the various modules for generating the query response. For simplicity, the response generation engine 146 including a query processing module 206, a query embedding module 208, a search indexing module 210, a results retrieval module 212, and a response generation module 214 is depicted in FIG. 2. It is contemplated that implementations of the present disclosure may be realized using any other appropriate modules of the response generation engine 146. The query processing module 206, the query embedding module 208, the search indexing module 210, the results retrieval module 212, and the response generation module 214 may also be collectively referenced to as modules 206-214 of the response generation engine 146. Each of the modules 206-214 of the response generation engine 146 may have sub-modules (not shown in FIG. 2). Additionally, or alternatively, each of the modules 206-214 of the response generation engine 146 may have different configurations.

The adaptive feedback engine 148 includes a RAG iteration controller module 216, as depicted in FIG. 2. The RAG iteration controller module 216 may initially set up the RAG query pipeline for generating a first completion response for the query in a first iteration. The RAG iteration controller module 216 may initially set up the RAG query pipeline based on a type of the data being ingested by the data ingestor 110 into the database 112 (depicted in FIG. 1), a type of the query to be answered, and an expected answer quality of the query response (e.g., precise, complete, elaborate explanation, summary, and/or the like). In an example, the RAG iteration controller module 216 may initially set up the RAG query pipeline for the first iteration by selecting all the modules 206-214 of the response generation engine 146 and determining configurations for all the modules 206-214 of the response generation engine 146. By way of non-limiting examples, the configurations determined for the query processing module 206 may indicate to decompose the query into sub-queries using step-back prompting and route the query to the vector database 116. The configurations determined for the search indexing module 210 may indicate to determine relevant results from the sentence level index in the vector database 116 for the query. In another example, the RAG iteration controller module 216 may initially set up the RAG query pipeline for the first iteration by selecting one or more of the modules 206-214 such as the query processing module 206 and the response generation module 214 and determining default configurations for query processing module 206 and the response generation module 214.

Implementations of the present disclosure are further described below by considering the RAG query pipeline that has been initially set up for the first iteration by selecting all the modules 206-214 of the response generation engine 146.

When the query is received through the interface tool 144, the query processing module 206 may process the query for further processing. The query processing module 206 may include sub-modules such as, a query construction sub-module, a query translation sub-module, and a query routing sub-module (not shown in FIG. 2).

The query construction module may convert the query (e.g., in the natural language format) into a format that may be interpreted and executed by the database 112 (shown in FIG. 1) including one or more of the relational database 114 (shown in FIG. 1), the vector database 116 (shown in FIG. 1), and the graph database 118 (shown in FIG. 1). In an example, the query may be converted into a SQL (Search Query Language) format for processing the query using the relational database 114. In another example, the query may be converted into a vector representation or embeddings for processing the query using the vector database 116. In yet another example, the query may be converted into a cypher query language for processing the query using the graph database 118.

The query translation sub-module may decompose the query into sub-queries. The sub-queries may capture different variations of forms of the query, thereby an intent of the query may be identified. The query translation sub-module may decompose the query into the sub-queries by identifying a type of the question to be answered. In some examples, the query translation sub-module may identify the type of the question based upon the expected answer quality of the query response. The expected answer quality may indicate one of: a precise answer, a complete answer, an answer with elaborate explanation, and/or a summary answer. In some examples, the query may be decomposed into the sub-queries using one or more techniques such as, step-back prompting, RAG fusion, multi-query approach, and/or the like. Such techniques are known in the art and not further discussed herein. It should be noted that one of the techniques may be used for decomposing the query into the sub-queries, based on the configurations determined for the query translation sub-module of the query processing module 206 by the RAG iteration controller module 216. By way of non-limiting example, a query like "what are the risks associated with medical devices?" may be decomposed into sub-queries related to "implantable devices," "surgical devices," and "wearable devices." The query translation sub-module may also generate pseudo-documents for the query. The pseudo-documents may include hypothetical documents, which may be used as intermediaries by the results retrieval module 212 in retrieving relevant results for the query. In some examples, the pseudo-documents may be generated, by way of non-limiting example, using a Hypothetical Document Embedding (HyDE) method as known in the art and therefore not further discussed herein. The query translation sub-module may also identify an index level till which the relevant results may be retrieved for the query. In some examples, the index level may include one or more of: a sentence level index, a paragraph level index, a page level index, a section level index, and/or a document level index. The query translation sub-module may identify the index level based on the type of question to be answered for the query and/or a length of each of the relevant results to be retrieved for the query from the database 112.

Once the query is decomposed into the multiple sub-queries and the pseudo-documents are generated for the query, the query routing sub-module may select the most appropriate database among the relational database 114, the vector database 116, and the graph database 118, to fetch the relevant results for the query. In some examples, the most appropriate database may be selected by performing logical routing. The logical routing may include leveraging the LLM 136 (shown in FIG. 1) or a different LLM to select the most appropriate database based on a structure of the query and pre-defined rules. In some other examples, the most appropriate database may be determined by performing semantic routing. The semantic routing may include leveraging embeddings and similarity measures of tokens or words in the query to identify an intent of the query and selecting the most appropriate database based on the identified intent of the query.

Upon preprocessing the query, the query embedding module 208 may convert the query into the vector representation or embeddings for further processing. In some examples, the query embedding module 208 may include an embedding model for converting the query into the vector representation or embeddings. The embedding model is well known and not further discussed herein.

Once the query is converted into the vector representation for further processing, the search indexing module 210 may perform a search on the most appropriate database determined among the relational database 114, the vector database 116, and the graph database 118 for the query to determine the relevant results for the query. The relevant results may include chunks of the data matching with the query. The terms "relevant results" and "relevant chunks" may be used interchangeably throughout the document. The relevant results may form context, while providing additional information for the query. In some examples, the search may include a semantic search, a similarity search, a keyword-based search, a hybrid search, and/or the like, which are well known and therefore not further discussed herein. It should be noted that the search may be performed based on the determined most appropriate database. In some examples, the search indexing module 210 may determine the relevant results for the query till from the index level determined for the query (by the query translation sub-module of the query processing module 206). By way of non-limiting example, if the index level is determined as the document level index, the different iterations may be performed to determine the relevant results progressively starting from the sentence level index, until determining the relevant results from the document level index. An example illustration of determining the relevant results based on the determined index level is described in conjunction with FIGS. 5A and 5B.

The results retrieval module 212 may retrieve the relevant results determined by the search indexing module 210 from the respective most appropriate database. The relevant results may include a preconfigured number of relevant results. In some examples, the number of relevant results may be preconfigured based on the type of question to be answered. The results retrieval module 212 may rank the relevant results based on their relevance. In some examples, if the results retrieval module 212 fails to retrieve the relevant results for the query from the determined most appropriate database, the results retrieval module 212 may re-retrieve the relevant results from new data sources (e.g., websites). Additionally, or alternatively, if the results retrieval module 212 fails to retrieve the relevant results for the query from the determined most appropriate database, the results retrieval module 212 may enable the query processing module 206 to refine or regenerate the query. In some examples, the results retrieval module 212 may also include an aggregation sub-module (not shown in FIG. 2) to aggregate the retrieved relevant results for the query.

The response generation module 214 may generate the first completion response for the query in the first iteration by processing the query and the relevant results (retrieved and aggregated for the query) using the LLM 136 (shown in FIG. 1).

The adaptive feedback engine 148 includes a first evaluation module 218, as depicted in FIG. 2, to evaluate the first completion response generated for the query. In the present disclosure, the first evaluation module 218 may also be referenced to as an outcome synthesizer. The first evaluation module 218 may evaluate the first completion response to identify quality of the first completion response. In some examples, the first evaluation module 218 may identify the quality of the first completion response by evaluating the first completion response based on the predetermined set of parameters (also be referenced to predetermined set of quality parameters). The set of parameters may be predetermined based on each of the queries and stored in the database 202. The predetermined set of parameters may act as evaluation configurations or Key Performance Indicators (KPIs), which may aid in identifying the quality of the first completion response. In some examples, the predetermined set of parameters may indicate criteria to be satisfied by the first completion response. By way of non-limiting example, the criteria may include, but are not limited to, expected aspects to be present in the first completion response, an expected answer quality of the first completion response, expectations for elements in the first completion response, and/or the like. The expected answer quality may indicate one of: a precise response, a complete response, an elaborated response, a summarized response, and/or the like. The expectations indicated by the predetermined set of parameters for the elements in the first completion response may be in terms of a quality, a writing style, a format, and/or the like. Therefore, with the predetermined set of parameters, the quality of the first completion response or gaps in the first completion response may be identified by determining a total number of missing expected aspects in the first completion response, whether the first completion response satisfies the expected answer quality, what elements in the first completion response are not as per the indicated expectations, and/or the like. In some examples, the first evaluation module 218 may also assign a quality score for the first completion response based on the identified quality of the first completion response. The first evaluation module 218 may provide information about the identified quality of the first completion response and/or the quality score assigned for the first completion response to the RAG iteration controller module 216. Therefore, the first evaluation module 218 may provide informative feedback regarding the first completion response to the RAG iteration controller module 216.

The RAG iteration controller module 216 may determine whether the identified quality of the first completion response satisfies the criteria indicated by the predetermined set of parameters or the quality score assigned for the first completion response by the first evaluation module 218 satisfies a first predetermined threshold. When it has been determined that the identified quality of the first completion response satisfies the criteria indicated by the predetermined set of parameters or the quality score assigned for the first completion response satisfies (e.g., greater than) a predetermined quality threshold, the RAG iteration controller module 216 determines that the first completion response as the query response (e.g., desired response) for the query. In some examples, the quality threshold may be predetermined based on an expected quality of the query response. Additionally, or alternatively, the quality threshold may be dynamically varied by comparing the expected quality of the query response with the quality of each completion response generated in each iteration.

Figure 3A:
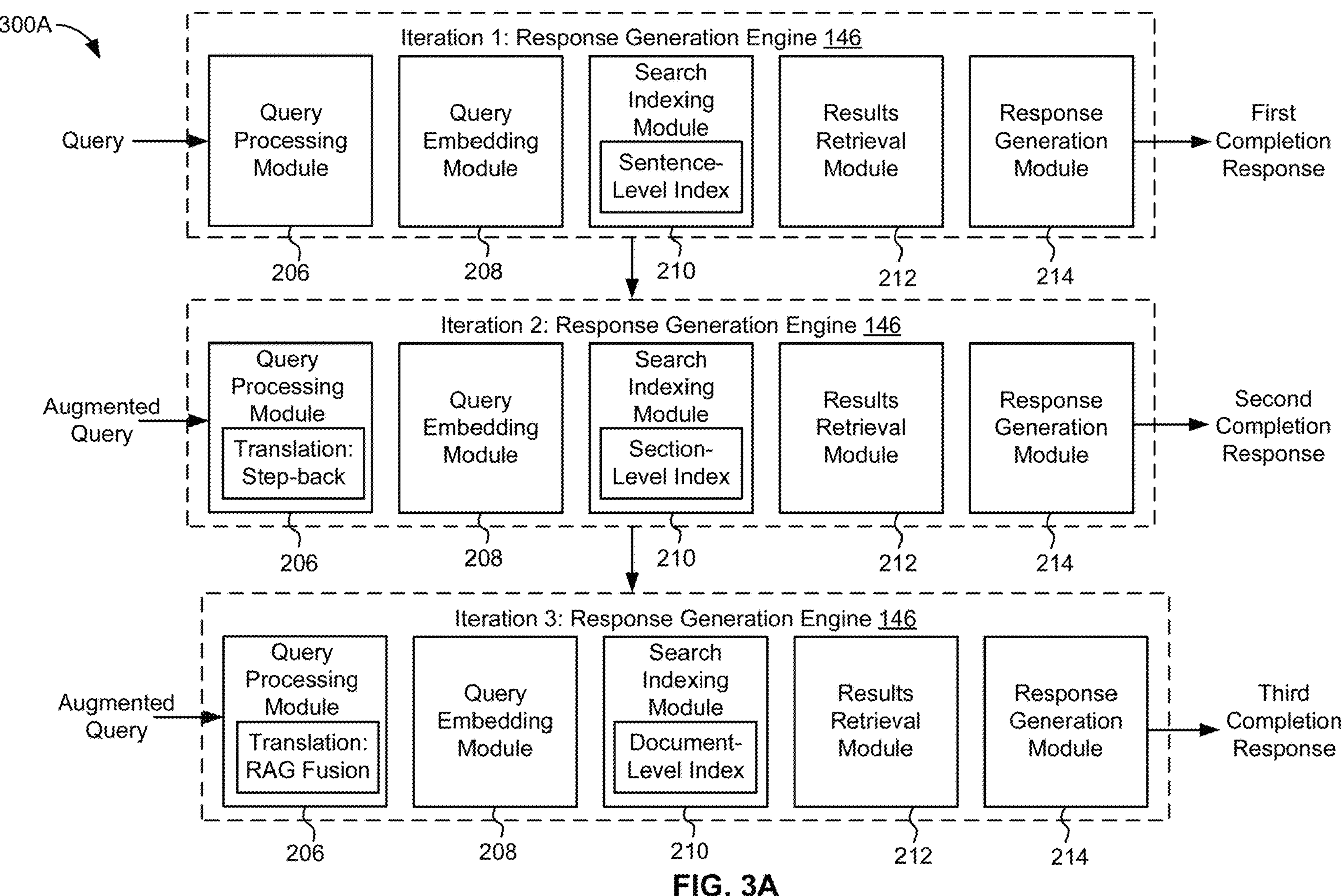
FIG. 3A depicts an example illustration of generating the query response for the query by determining a configuration change for a RAG query pipeline at each iteration, in accordance with implementations of the present disclosure.
Figure 3B:
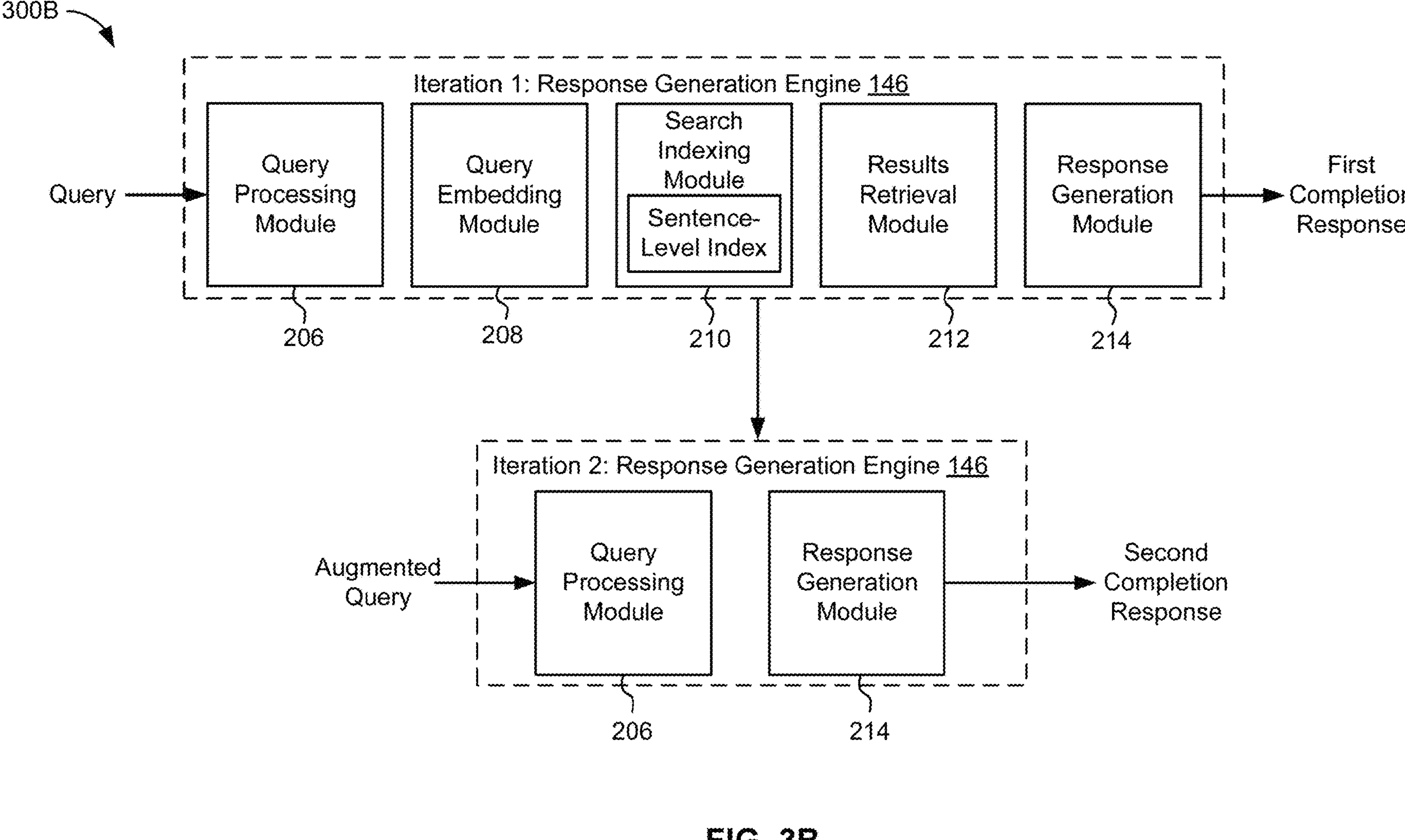
FIG. 3B depicts an example illustration of generating the query response for the query by determining an action change and a configuration change for the RAG query pipeline at each iteration, in accordance with implementations of the present disclosure.

When it has been determined that the identified quality of the first completion response fails to satisfy the criteria indicated by the predetermined set of parameters or the quality score assigned for the first completion response does not satisfy (e.g., lesser than or equal to) the first predetermined quality threshold, the RAG iteration controller module 216 may determine to generate a second completion response for the query and modify the RAG query pipeline for generating the second completion response. The RAG iteration controller module 216 may modify the RAG query pipeline by determining an action change and/or a configuration change based on the quality of the first completion response. In the present disclosure, the action change and the configuration change may be referenced to as a dynamic pipeline configuration and adaptive module configuration, respectively. The action change may include reselecting one or more of the modules 206-214 of the response generation engine 146 for generating the second completion response in a second iteration. Therefore, only the reselected one or more of the modules 206-214 may be enabled or switched ON in the RAG query pipeline for generating the second completion response in the second iteration. The configuration change may indicate new configurations for each of the reselected one or more of the modules 206-214 of the response generation engine 146. The action change and/or the configuration change may prevent an additional completion response corresponding to the first completion response being generated by performing another same or similar components or component configuration used during the previous iteration. In some examples, the action change and/or the configuration change may correspond with one or more of: reprocessing or retranslating the query, routing the reprocessing or retranslating the query to the same or different databases 114-118 of the database 112, and/or the like. Examples of the configuration change and the action change are illustrated in FIGS. 3A and 3B, respectively. In some implementation, the RAG iteration controller module 216 may also enable the query processing module 206 to generate an augmented query for the second iteration. The augmented query may include the received query, and the relevant results retrieved for the query in the first iteration.

Once the RAG query is modified based on the action change and/or the configuration change determined on the evaluation of the first completion response, the RAG iteration controller module 216 may enable the response generation engine 146 to generate the second completion response using the modified RAG query pipeline for the query (e.g., the augmented query) in the second iteration.

Upon generating the second completion response, the first evaluation module 218 may evaluate second completion response to identify the quality of the second completion response and assign the quality score for the second completion response. The first evaluation module 218 may evaluate the second completion response similar to evaluation of the first completion response, therefore repeated description is omitted herein for sake of brevity.

In some implementations, along with the first evaluation module 218, the adaptive feedback engine 148 may include a second evaluation module 220 to identify evolution of completion responses. The second evaluation module 220 may compare the second completion response with the first completion response to identify evolution quality of the second completion response with respect to the first completion response. The evolution quality of the second completion response with respect to the first completion response may be identified by comparing the second completion response with the first completion response based on a predetermined set of evolution parameters. The set of evolution parameters may be predetermined based on the query and stored in the database 202. By way of non-limiting example, the predetermined set of evolution parameters may indicate criteria such as a progression to be achieved in the quality of the second completion response from the first completion response, an expected overlap between the second completion answer, and the first completion response, an expected toggling between the second completion answer and the first completion response, and/or the like. Therefore, the evolution quality of the second completion response with respect to the first completion response may be identified by determining whether there is progression or degression in the quality of the second completion response from the first completion response, whether there is an overlap between the second completion response and the first completion response, and whether there is a toggling between the second completion response and the first completion response, leading to an infinite loop of iterations, and/or the like. Based on evaluation of the second completion response with respect to the first completion response, the second evaluation module 220 may assign an evolution score for the second completion response. The second evaluation module 220 may provide information about the evolution quality of the second completion response and/or the evolution score to the RAG iteration controller module 216.

The RAG iteration controller module 216 may evaluate the quality of the second completion response by determining whether the quality satisfies the criteria indicated by the predetermined set of parameters or the quality score satisfies the predetermined quality threshold. Also, the RAG iteration controller module 216 may evaluate the evolution quality of the second completion response by determining whether the evolution quality satisfies the criteria indicated by the predetermined set of evolution parameters or the evolution score satisfies a predetermined evolution threshold. In some examples, the evolution threshold may be predetermined based on an expected evolution quality of the query response. Additionally, or alternatively, the quality threshold may be dynamically varied by comparing the expected evolution quality of the query response with the evolution quality of each completion response generated in each iteration. If the quality of the second completion response satisfies the criteria indicated by the predetermined set of parameters or the quality score satisfies the predetermined quality threshold, and/or the evolution quality of the second completion response satisfies the criteria indicated by the predetermined set of evolution parameters or the evolution score satisfies the predetermined evolution threshold, the RAG iteration controller module 216 may determine the second completion response as the query response for the query.

If the quality of the second completion response fails to satisfy the criteria indicated by the predetermined set of parameters and/or the evolution quality of the second completion response fails to satisfy the criteria indicated by the predetermined set of evolution parameters, the RAG iteration controller module 216 may iteratively perform steps of modifying the RAG query pipeline, augmenting the query with the relevant results retrieved in a previous iteration, enabling the response generation engine 146 to generate a subsequent completion response (e.g., third, fourth, fifth, and/or the like) for the augmented query using the modified RAG query pipeline, and identifying the quality and the evolution quality of the subsequent completion response to assign the quality score and the evolution quality score. Therefore, the one or more completion responses may be subsequently generated during the one or more different iterations using the dynamic RAG query pipeline. In some examples, the different iterations may be performed until generating a completion response with the quality score and the evolution score satisfying the respective predetermined thresholds. The first evaluation module 218 and the second evaluation module 220 may evaluate each of the subsequently generated one or more completion responses to identify the quality or the quality score, and/or the evolution quality or the evolution quality score for each of the subsequently generated one or more completion responses. Based upon such evaluation, the RAG iteration controller module 216 may determine, from the subsequently generated one or more completion responses, a completion response as the query response for the query. The determined completion response may have the quality satisfying the criteria indicated by the predetermined set of parameters and/or the evolution quality satisfying the criteria indicated by the predetermined set of evolution parameters. Alternatively, the determined completion response may have the quality score satisfying the predetermined quality threshold and/or the evolution score satisfying the predetermined evolution threshold.

For example, as depicted in FIG. 3A, consider a scenario 300A where the response generation engine 146 receives an example query "Where is the air conditioning in the car?" and uses the modules 206-214 and the configurations of each of the modules 206-214 (as indicated in the RAG query pipeline that has been initially set up for the query) to generate a first completion response as "in the front of the car" in a first iteration. In the first iteration, the first completion response may be generated by retrieving the relevant results from the sentence level index. The first evaluation module 218 evaluates the first completion response and identifies that quality of the first completion response fails to satisfy the expected answer quality (e.g., complete answer). In accordance with the evaluation performed by the first evaluation module 218, the RAG iteration controller module 216 may modify the RAG query pipeline by changing the configurations for the modules 206-214 of the response generation engine 146. For instance, the RAG iteration controller module 216 may change the configurations for the search indexing module 210 to perform the search on the vector database 116 (shown in FIG. 1) based on the section-level index from the sentence level index. Therefore, implementations of the present disclosure may enable the RAG iteration controller module 216 to dynamically select the index level for retrieving the relevant results for the query, without maintaining any relationship between the index levels. For example, once the relevant results from a low-level index (e.g., the sentence level index) is retrieved for the query, the query may be augmented with the retrieved results from the low-level index and researched for relevant results from any high-level index (e.g., the section level index). Therefore, diversity of relevant results retrieved for the query may be enhanced and a probability of generating a completion response including the complete answer may be improved. Upon modifying the RAG query pipeline, the RAG iteration controller module 216 may enable the query processing module 206 to generate an augmented query, which includes the received query and the retrieved results from the sentence level index.

The RAG iteration controller module 216 may enable the response generation engine 146 to generate a second completion response for the augmented query in a second iteration using the modified RAG query pipeline. The second completion response may be generated as "in the front of the car, under the hood." The first evaluation module 218 may evaluate the second completion response and identify that quality of the second completion response fails to satisfy the expected answer quality, as the second completion response does not include the complete answer. The second evaluation module 220 may evaluate the second completion response with respect to the first completion response and identify that there is progression in the quality of the second completion response from the first completion response. Based on the evaluation of the second completion response by the first evaluation module 218 and the second evaluation module 220, the RAG iteration controller module 216 may modify the RAG query pipeline. For example, the RAG iteration controller module 216 may change the configurations for the query translation submodule of the query processing module 206 to decompose the query into sub-queries using RAG-fusion technique and configurations for the search indexing module 210 to perform the search on the vector database 116 based on the document-level index. Also, the RAG iteration controller module 216 may enable the query processing module 206 to generate an augmented query for a third iteration. The augmented query generated for the third iteration may include the augmented query of the second iteration and the relevant results retrieved from the section level index in the second iteration. The RAG iteration controller module 216 may enable the response generation engine 146 to use the RAG query pipeline modified based on the second iteration to generate a third completion response for the augmented query in the third iteration. The third completion response may be generated as "Air conditioning in the car is located in the front of the car, under the hood, and behind the dashboard." The first evaluation module 218 and the second evaluation module 220 may evaluate that the third completion response includes the complete answer and there is a progression in quality of the third completion response from the second completion response. Therefore, the RAG iteration controller module 216 may determine and present the third completion response as the query response for the query.

For another example, as depicted in FIG. 3B, consider a scenario 300B where the response generation engine 146 receives a generic or simple query like "What is the endowment policy?" and uses the modules 206-214 and the configurations of each of the modules 206-214 (as indicated in the RAG query pipeline that has been initially set up for the query) to generate a first completion response. The first completion response may be generated as "An endowment policy is a life insurance policy, and an endowment fund is an investment portfolio with the initial capital deriving from donations." The first evaluation module 218 evaluates the first completion response and identifies that the first completion response is noisy as the first completion response includes irrelevant information (e.g., not the expected aspects) and fails to meet the expected answer quality (e.g., precise answer). In accordance with the evaluation performed by the first evaluation module 218, the RAG iteration controller module 216 may modify the RAG query pipeline by reselecting only the query processing module 206 and the response generation module 214 for generation of a second completion response and determining configurations for the selected query processing module 206 and the response generation module 214. Therefore, unnecessary modules of the response generation engine 146 may be disabled for a next iteration. By disabling the unnecessary modules, performance of the system 102 may be boosted, while reducing a number of iterations and time required for generating the query response with high accuracy or quality. Also, the RAG iteration controller module 216 may enable the query processing module 206 to generate an augmented query for a second iteration. The augmented query may include the received query and the retrieved results for the query in the first iteration.

Once the RAG query pipeline is modified, the RAG iteration controller module 216 may enable the response generation engine 146 to generate the second completion response for the augmented query in the second iteration using the RAG query pipeline modified based on the first iteration. The second completion response may be generated as "an insurance plan that offers life insurance cover as well as long-term savings with assured returns." The first evaluation module 218 evaluates the second completion response and identifies that quality of the second completion response satisfies the expected answer quality (e.g., precise answer without any irrelevant information). The second evaluation module 220 evaluates the second completion response with respect to the first completion response and identifies that there is progression in the quality of the second completion response from the first completion response. Based on such evaluation, the RAG iteration controller module 216 may determine and present the second response as the query response for the query.

Various examples of generating the query response for the query are described below by considering various configurations of the search indexing module 210 and the query processing module 206 of the response generation engine 146 for ease of description. However, as would be understood, various configurations of other modules such as the query embedding module 208, the results retrieval module 212, and the response generation module 214 may be considered.

Figure 4:
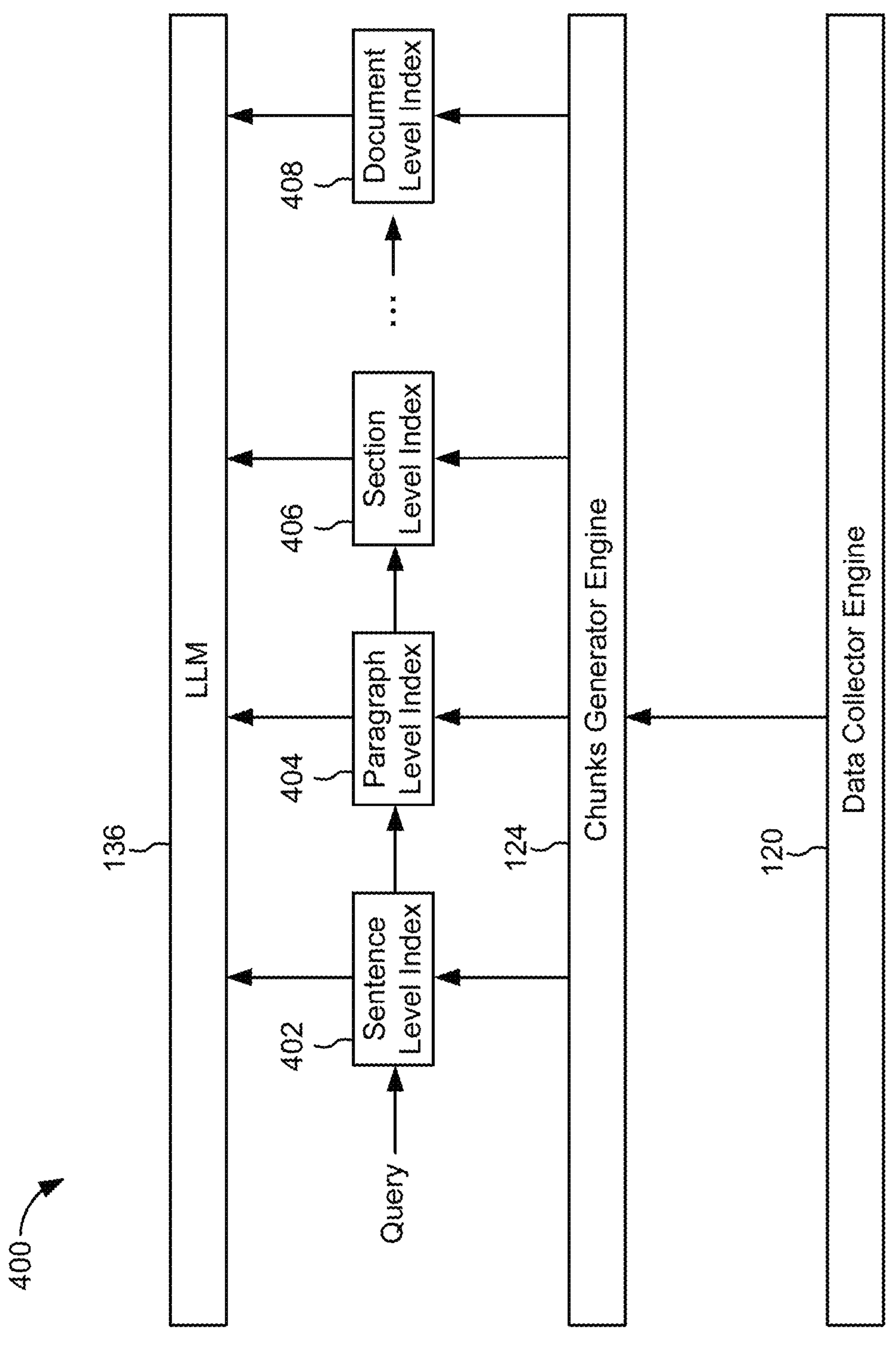
FIG. 4 depicts an example illustration of generating the query response for the query using configurations indicating hierarchical indexing for a search indexing module, in accordance with implementations of the present disclosure.

FIG. 4 depicts an example illustration 400 of generating the query response for the query using configurations indicating hierarchical indexing for the search indexing module 210, in accordance with implementations of the present disclosure. Generating the query response may be described in FIG. 4 using components of the data ingestion system 104 and modules of the interface tool 144, the response generation engine 146, and the adaptive feedback engine 148, as described in relation to FIG. 1 and/or FIG. 2. The hierarchical indexing may enable the search indexing module 210 to determine the relevant results from the query from different index levels, progressively starting from the low-level index.

As depicted in FIG. 4, the data collector engine 120 may collect documents from the various data sources (not shown). The documents may be related to the various domains. Optionally, the documents may be preprocessed using the data processor engine 122 (shown in FIG. 1). Upon collecting and/or preprocessing the documents, the chunks generator engine 124 may convert the documents into multiple chunks. Each of the multiple chunks may include text segments of a variable length. The indexing engine 126 may assign or create different index levels for the chunks, thereby the documents may be indexed. The index levels may include a sentence level index 402, a paragraph level index 404, a section level index 406, a document level index 408, and/or the like. The indexed documents may be stored in the database, for example, the vector database 116 (shown in FIG. 1). Collection of the documents, converting the documents into the multiple chunks, and indexing each of the multiple chunks or documents are already described in detail in conjunction with FIG. 1, therefore repeated description is omitted herein for sake of brevity.

The multiple chunks or documents indexed and stored in the vector database 116 may be used to generate the query response for the query. For example, consider that the interface tool 144 receives a query "Whether using social media at work affect productivity.?" Upon receiving the query, the query processing module 206 and the query embedding module 208 may process and convert the query into embeddings, respectively. Thereafter, the search indexing module 210 configured with the hierarchical indexing may progressively determine the chunks of variable lengths (e.g., the chunks assigned with the different index levels) that are semantically similar to the query, thereby determining the relevant results for the query.

For example, in a first iteration, the search indexing module 210 may perform a semantic search on the vector database 116 to determine relevant chunks assigned with the sentence level index 402 and are semantically similar to the query as the context for the query. In a second iteration, the search indexing module 210 may perform the semantic search on the vector database 116 to determine relevant chunks assigned with the paragraph level index 404 and are semantically similar to the query as the context for the query. In a third iteration, the search indexing module 210 may perform the semantic search on the vector database 116 to determine relevant chunks assigned with the section level index 406 and are semantically similar to the query as the context for the query. Similarly, the search indexing module 210 may iteratively perform the semantic search on the vector database 116 to determine relevant chunks assigned with the different index levels as the context for the query. Therefore, a diverse set of relevant chunks may be retrieved for the query, which may aid in improving the quality of the query response. In some examples, the semantic search may involve computing a cosine similarity score between the query and each of the chunks of the different index levels to measure semantic relatedness between the query and each of the chunks. To illustrate further, an example table 1 is provided below, wherein the example table 1 depicts the cosine similarity score between the query and each of the chunks assigned with the sentence level index, the paragraph level index, and the section level index.

TABLE 1

Cosine Similarity Score between query and each of the chunks

| Index Level | Query | Chunk (Text Segment) | Cosine similarity score (Query, Chunk) |
|---|---|---|---|
| Sentence level Index | Whether using social media at work affect productivity? | And more importantly using social media at work can affect productivity and focus. | 0.98 |
| Paragraph Level Index | Whether using social media at work affect productivity? | Most of your employees are likely to use one or more social platforms. Whatever they post on their personal accounts can be a potential risk for your company (e.g., if they share sensitive information). And, more importantly, using social media at work can affect productivity and focus. This is one of the reasons you need a company social media policy - to address limitations on what employees can post and to potentially place restrictions on social media use inside the workplace. | 0.75 |
| Section Level | Whether using social media at | Most of your employees are likely to use one or more social platforms. Whatever they post | 0.56 |

TABLE 1-continued

| Cosine Similarity Score between query and each of the chunks | | | |
|---|---|---|---|
| Index Level | Query | Chunk (Text Segment) | Cosine similarity score (Query, Chunk) |
| Index | work affect productivity? | on their personal accounts can be a potential risk for your company (e.g., if they share sensitive information). And, more importantly, using social media at work can affect productivity and focus. This is one of the reasons you need a company social media policy - to address limitations on what employees can post and to potentially place restrictions on social media use inside the workplace. The other reason is your own social media profile; as an organization, you'll want to have a consistent voice on your social media and want to avoid posting potentially risky statements or information. A social media policy for employees can give them the instructions they need to know how to handle corporate accounts. | |

The relevant chunks retrieved in the iterations may be processed along with the query using the LLM 136 (shown in FIG. 1) for generating respective completion responses for the query. One of the completion responses satisfying the criteria predetermined by the predetermined set of parameters and/or the predetermined set of evolution parameters may be provided as the query response for the query.

Figure 5A:
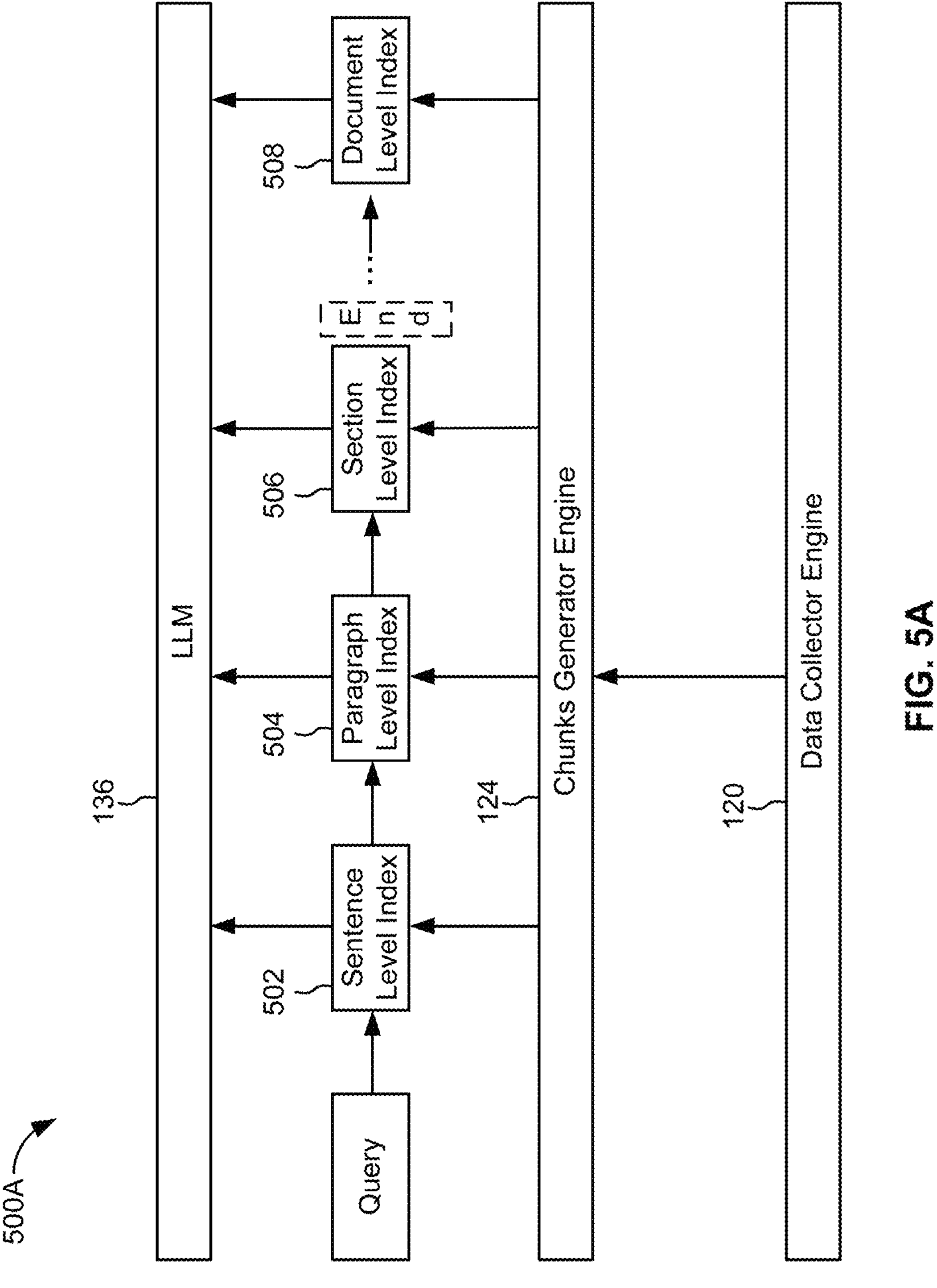
FIG. 5A depicts an example illustration of generating the query response for the query using configurations indicating hierarchical indexing with adaptive length segment identification, in accordance with implementations of the present disclosure.

FIG. 5A depicts an example illustration 500A of generating the query response for the query using configurations indicating hierarchical indexing with adaptive length segment identification, in accordance with implementation of the present disclosure. FIG. 5A is described in conjunction with FIGS. 1, 2, and 4. The configurations indicating the hierarchical indexing with the adaptive length segment identification may enable the search indexing module 210 to iteratively determine the relevant results from the query from different index levels, progressively starting from the low-level index, until determining the relevant results for the query from the index level determined for the query. The configurations indicating the hierarchical indexing with the adaptive length segment identification may be suitable for a use case where the required query response is present in a same document.

As illustrated in FIG. 5A, the data collector engine 120 and the chunks generator engine 124 may respectively collect and convert documents related to the various domains into the multiple chunks. Each of the multiple chunks may be assigned with the index level, for example, a sentence level index 502, a paragraph level index 504, a section level index 506, a document level index 508, and/or the like and stored in the vector database 116, which is described in detail in conjunction with FIGS. 1 and 4.

Among the multiple chunks or documents indexed and stored in the vector database 116, relevant chunks (e.g., the relevant results matching the query) may be retrieved and used to generate the query response for the query. In some examples, a length of a relevant chunk to be retrieved for the query may depend on the question. To illustrate further, a query like "what is the height of Eifel tower?" may require the query response in 1 or 2 sentences or a query like "Is there any risk if employee post about the company on their personal social media?" may require the query response in words (e.g. 'Yes' or 'No'). In such examples, the relevant chunk assigned with the sentence level index 502 may be suitable for the query. Some other queries like "what is the importance of the passport?," "Explain more about Eifel tower?," and/or the like may require the query response in a paragraph. For such queries, the relevant chunks assigned with the paragraph level index 504 may be suitable. Some other queries like "What is the procedure to apply for a passport?," "Give a reason why social media policy is required," "Explain the strictness of social media policy," and/or the like, may require the query response in sections. For such queries, the relevant chunks assigned with the section level index 506 may be suitable. Therefore, the RAG iteration controller module 216 (shown in FIG. 2) may determine the configurations for the query processing module 206 to identify the length of the relevant chunk to be retrieved and accordingly identify an index level that may be used for retrieving the relevant chunks for the query. Each of the relevant chunks may be of the identified length. The length of the relevant chunk may be determined based on one or more of: a type of the query, a length of the chunk matching the query, and a change of similarity measure to identify the chunk matching the query. With such configurations, the relevant chunks for the query may be iteratively fetched until the relevant chunks of the determined index level are fetched.

In an example, as depicted in FIG. 5A, the RAG iteration controller module 216 may thus initially determine configurations for the query processing module 206 to determine an index level until the relevant chunks or results for the query are retrieved. By way of non-limiting example, the query processing module 206 may determine the section level index 506 for the query. Accordingly, the RAG iteration controller module 216 may determine the configurations for the search indexing module 210 to progressively retrieve the relevant chunks for the query from the low-level index till the section level index 506.

To illustrate further, in a first iteration, the search indexing module 210 may determine the relevant chunks assigned with the sentence level index 502 for the query. The determined relevant chunks may be retrieved and provided along with the query to the LLM 136 for generating a first completion response. Based on evaluation of the first completion response, the RAG iteration controller module 216 may determine the configurations for the search indexing module 210 to determine the relevant chunk assigned with the paragraph level index 504 in a second iteration. Accordingly, the search indexing module 210 may determine the relevant chunks assigned with the paragraph level index 504 for the query in the second iteration. The determined relevant chunks may be retrieved and provided along with the query to the LLM 136 for generating a second completion response. Based on evaluation of the second completion response, the RAG iteration controller module 216 may determine the configurations for the search indexing module 210 to determine the relevant chunks assigned with the section level index 506 in a third iteration. Accordingly, the search indexing module 210 may determine the relevant chunks assigned with the section level index 506 for the query in the third iteration. The determined relevant chunks may be retrieved and provided along with the query to the LLM 136 for generating a third completion response. The third completion response may be provided as the query response for the query based on evaluation of the third completion response. As would be understood, the RAG iteration controller module 216 may limit the configurations for the search indexing module 210 to determine till the relevant chunks assigned with the section level index 506, as the determined index level for the query is the section level index 506. When the relevant chunks assigned with the section level index 506 is determined and the third completion response fails to satisfy the criteria indicated by the predetermined set of parameters and the predetermined set of evolution parameters, the RAG iteration controller module 216 may disable the search indexing module 210 and the results retrieval module 212 in next subsequent iterations of generating subsequent completion responses. Therefore, the subsequent completion responses may be generated with reduced computing resources, time, and cost. The subsequent completion responses may be evaluated and accordingly one of the subsequent completion responses may be provided as the query response for the query.

Further, the configurations indicating the hierarchical indexing with the adaptive length segment identification may improve the quality or accuracy of the query response, which is described using an example table 2 below.

TABLE 2

Query Response Generation Based Hierarchical Indexing with Adaptive Length Segment Identification

| Index Level | Query | Relevant Chunk (Context) | Query Response |
|---|---|---|---|
| Sentence Level Index | Give a reason why social media policy is required? | And more importantly using social media at work can affect productivity and focus. | No Answer |
| Paragraph Level Index | Give a reason why social media policy is required? | Most of your employees are likely to use one or more social platforms. Whatever they post on their personal accounts can be a potential risk for your company (e.g., if they share sensitive information). And, more importantly, using social media at work can affect productivity and focus. This is one of the reasons you need a company social media policy - to address limitations on what employees can post and to potentially place restrictions on social media use inside the workplace. | Sharing of sensitive information can be risk to the company |
| Section Level Index | Give a reason why social media policy is required? | Most of your employees are likely to use one or more social platforms. Whatever they post on their personal accounts can be a potential risk for your company (e.g., if they share sensitive information). And, more importantly, using social media at work can affect productivity and focus. This is one of the reasons you need a company social media policy - to address limitations on what employees can post and to potentially place restrictions on social media use inside the workplace. The other reason is your own social media profile; as an organization, you'll want to have a consistent voice on your social media and want to avoid posting potentially risky statements or information. A social media policy for employees can give them the instructions they need to know how to handle corporate accounts | Following are the reasons for need of social media policy: Sharing of sensitive information can be risk to the company. To have consistent voice and avoid potentially risky statements. |

Figure 5B:
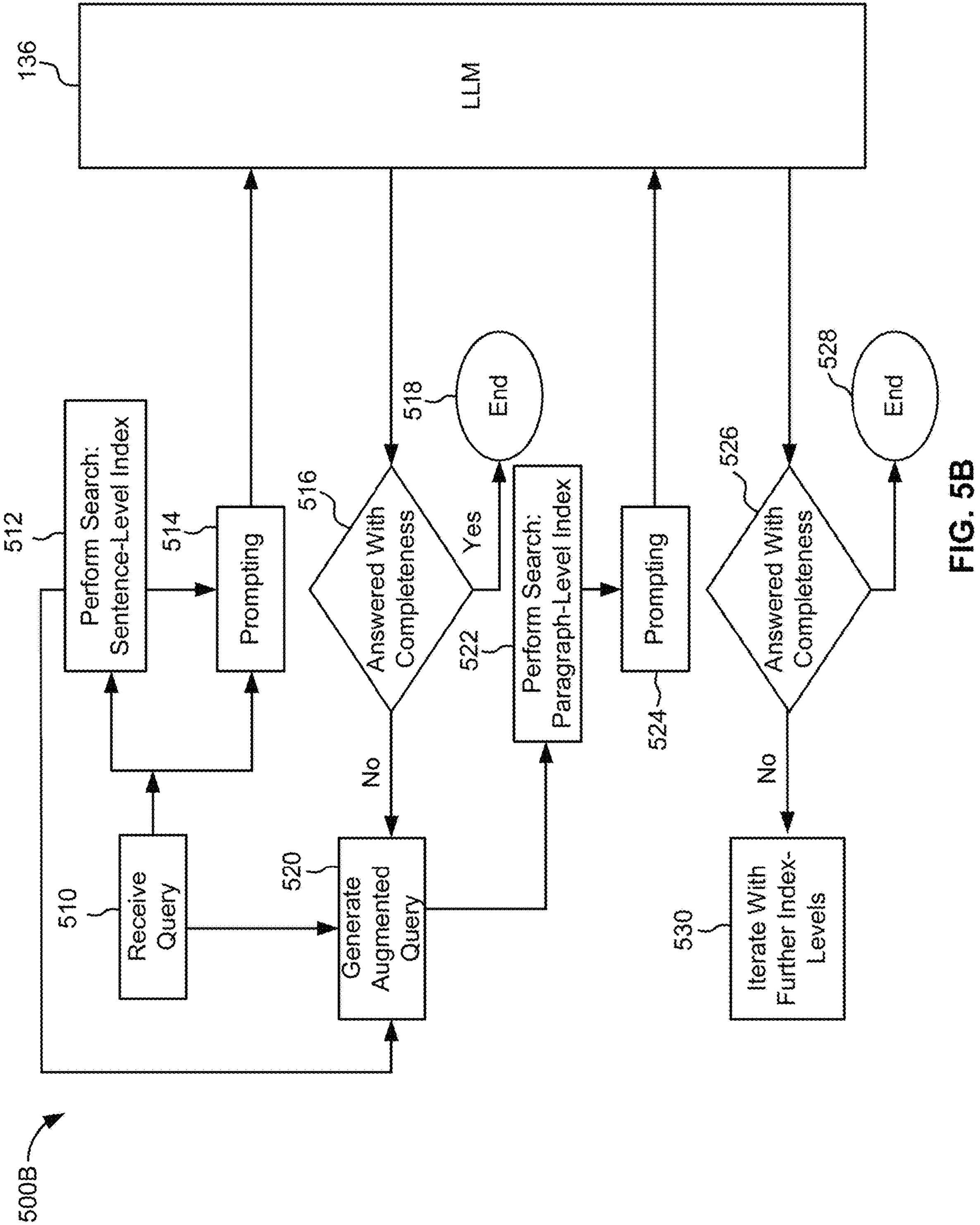
FIG. 5B depicts an example process flow of generating the query response for the query using the configurations indicating the hierarchical indexing with the adaptive length segment identification, in accordance with implementations of the present disclosure.

FIG. 5B depicts an example process flow 500B of generating the query response for the query using the configurations indicating the hierarchical indexing with the adaptive length segment identification, in accordance with implementation of the present disclosure. FIG. 5B is described in conjunction with FIGS. 1, 2, 4, and 5A.

The search indexing module 210 receives 510 the query. The query may be preprocessed and converted into embeddings. Upon receiving the query, the search indexing module 210 performs 512 a search on the database 112, for example, the vector database 116, to determine relevant Top-K results from the sentence level index for the query. In some examples, the search may include a similarity search. The relevant Top-K results may include chunks assigned with the sentence level index and matching with the query. The results retrieval module 212 may retrieve the relevant Top-K results of the sentence level index from the vector database 116. Once the relevant Top-K results are retrieved, the response generation module 214 performs 514 prompting of the LLM 136 along with the query and the retrieved relevant Top-K results from the sentence level index to obtain a first completion response for the query.

Upon obtaining the first completion response, the first evaluation module 218 evaluates 516 whether the first completion response is answered with completeness. If the first completion response is answered with completeness, the RAG iteration controller module 216 determines the first completion response as the query response for the query and ends 518 the process flow of generating the query response for the query. If the first completion response fails to be answered with completeness, the RAG iteration controller module 216 enables the query processing module 206 to generate 520 an augmented query (e.g., regenerating the query). The augmented query may include the query and the relevant Top-K results retrieved from the sentence level index. Therefore, the augmented query may provide additional context for further generation of a second completion response.

The search indexing module 210 performs 522 the search (e.g., the similarity search) on the vector database 116, to determine relevant Top-K results from the paragraph level index for the augmented query. The relevant Top-K results may include chunks assigned with the paragraph level index and matching with the augmented query. The results retrieval module 212 may retrieve the relevant Top-K results of the paragraph level index from the vector database 116 for the augmented query. The response generation module 214 performs 524 prompting of the LLM 136 along with the augmented query and the relevant Top-K results retrieved from the paragraph level index to generate the second completion response.

Upon obtaining the second completion response, the first evaluation module 218 evaluates 526 whether the second completion response is answered with completeness. As would be understood, additionally, or alternatively, the second evaluation module 220 may also evaluate for the evolution of the second completion response with respect to the first completion response. If the second completion response is answered with completeness, the RAG iteration controller module 216 determines the second completion response as the query response for the query and ends 528 the process flow of generating the query response for the query. If the second completion response fails to be answered with completeness, the RAG iteration controller module 216 iteratively performs 530 steps of: enabling the query processing module 206 to generate a subsequent augmented query, enabling the search indexing module 210 to determine the relevant Top-K results for the subsequent augmented query from a next index level, enabling the response generation module 214 to generate a subsequent completion response for the subsequent augmented query using the determined relevant Top-K results, and performing evaluation of the subsequent completion response, until determining the relevant Top-K results from the index level (e.g., the section level index) determined for the query.

Figure 6:
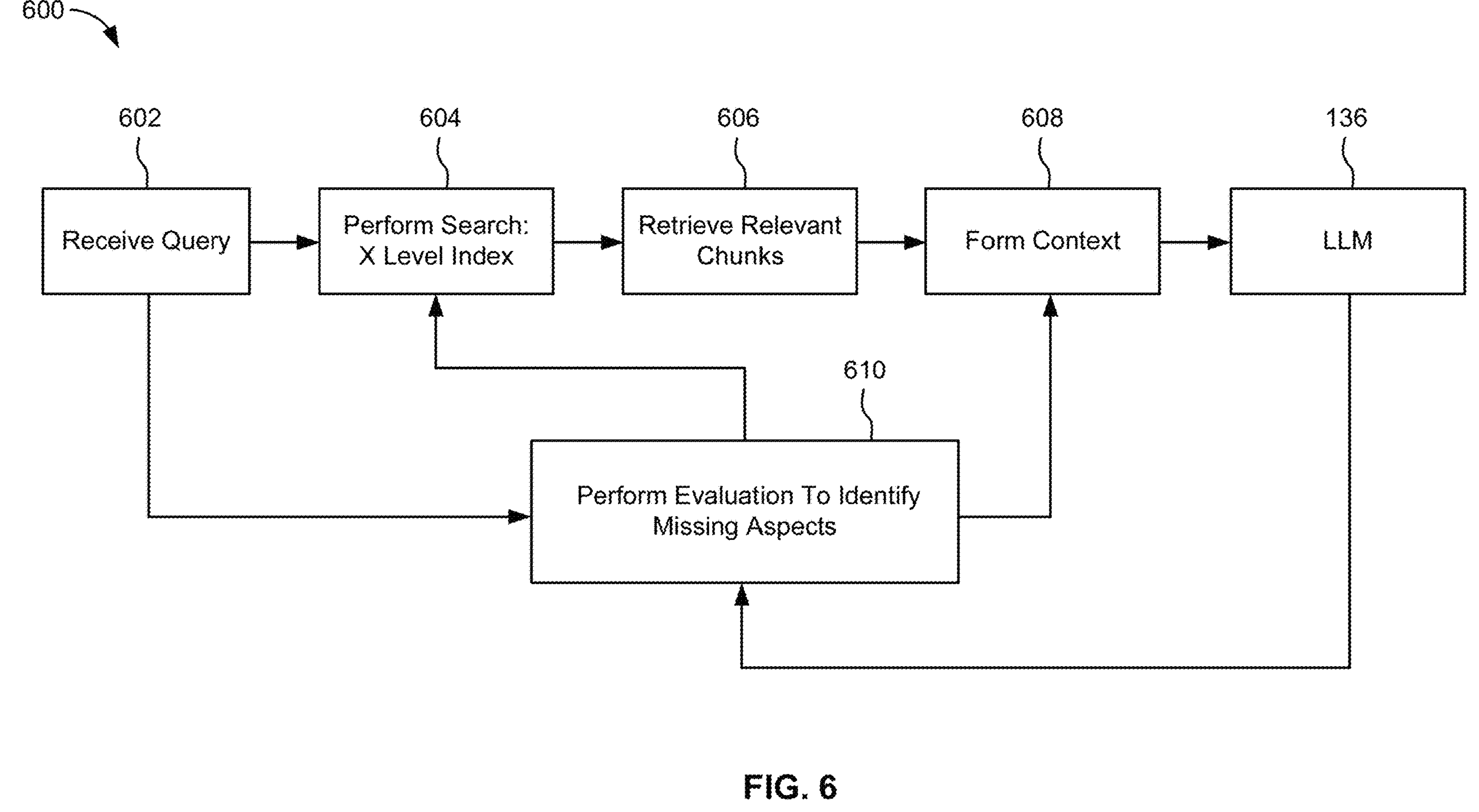
FIG. 6 depicts an example process flow of generating the query response for the query using configurations determined for multi-document context generation based on missing aspects, in accordance with implementations of the present disclosure.

FIG. 6 depicts an example process flow 600 of generating the query response for the query using configurations determined for multi-document context generation based on missing aspects or according to expectations of the user, in accordance with implementations of the present disclosure. The multi-document context generation may involve retrieving relevant results as context for the query when the required query response for the query is distributed across multiple documents. For example, a query like "What is social media policy and what kind of document is it" may be received for a query response. In such a scenario, an answer for "What is social media policy?" may be present in a document A and an answer for "What kind of document is it" may be present in a document B. Therefore, the query response is required to be generated by retrieving contents from the document A and the document B. For another example, a query like "What are the GST rates on aluminum in State A" may be received for a query response. For such a query, the query response may be generated only by retrieving a content 1 and a content 2 such as "State A is defined as Zone 2" and "GST of Aluminum in Zone 2 may include 18%" present in a document 1 and a document 2, respectively. Without retrieving such contents from the multiple documents, no query response may be generated that would match the desired accuracy standards or expectations of the user. Therefore, for the multi-document context generation, the RAG iteration controller module 216 may determine configurations for the query processing module 206 to decompose the query into the sub-queries and configurations for the search indexing module 210 to estimate when the contents have to be determined from the multiple documents and what are the contents that have to be determined from the multiple documents. Also, the RAG iteration controller module 216 may determine configurations for the search indexing module 210 to use different index levels during different iterations of response generation. As the different index levels are not connected with each other in the present disclosure, retrieving the relevant results for the query may result in a scalable process and extendable to any number of index levels. Also, as a new index type and/or index level is used at each iteration of response generation, an error correction in retrieval of the relevant results for the query may be corrected. For example, chances of wrong retrieval of the results from the sentence level index may be corrected at retrieval of the results from the paragraph level index. Such an error correction may improve retrieval of the relevant results from the documents, which are lengthy and related to same specific topics such as process documents used in enterprise operations. The process flow 600 of generating the query response for the query using the configurations determined for the multi-document context generation is described in detail below.

The query processing module 206 receives 602 the query and processes the query by decomposing the query into the sub-queries. Upon processing the query, the search indexing module 210 performs a search 604 (e.g., similarity search) on the vector database 116 to determine relevant chunks (e.g., the relevant results matching with the query) assigned with an X-level index for the query. In an example, the X-level index may include one of: a sentence level index, a paragraph level index, a section level index, and a document level index. The results retrieval module 212 retrieves 606 the determined relevant chunks of the X-level index from the vector database 116 and forms 608 a context for the query by aggregating the retrieved relevant chunks. The response generation module 214 prompts the LLM 136 along with the query and the context to generate a first completion response for the query.

Upon generating the first completion response for the query, the first evaluation module 218 performs 610 evaluation of the first completion response with respect to the sub-queries of the query to identify expected aspects missing in the first completion response. Therefore, based on the evaluation, the RAG iteration controller module 216 may identify whether the first completion response includes answers for all the sub-queries of the query. When it has been identified that the first completion response includes the answers for all the sub-queries of the query, the RAG iteration controller module 216 may provide the first completion response as the query response for the query.

When it has been identified that the first completion response does not include the answers for all the sub-queries of the query, the RAG iteration controller module 216 may iteratively perform steps of: (i) enabling the query processing module 206 to regenerate the query by updating the query with the sub-queries for which the answers have not been generated; (ii) changing the X-level index (e.g., from the sentence level index to the document level index); (iii) enabling the search indexing module 210 to determine and retrieve new relevant chunks for the regenerated query using the changed X-level index; (iv) enabling the results retrieval module 212 to form a new context based on the new relevant chunks; and (v) enabling the response generation module 214 to generate a subsequent completion response using the new context, until generating all the answers for all the sub-queries of the query.

Figure 7:
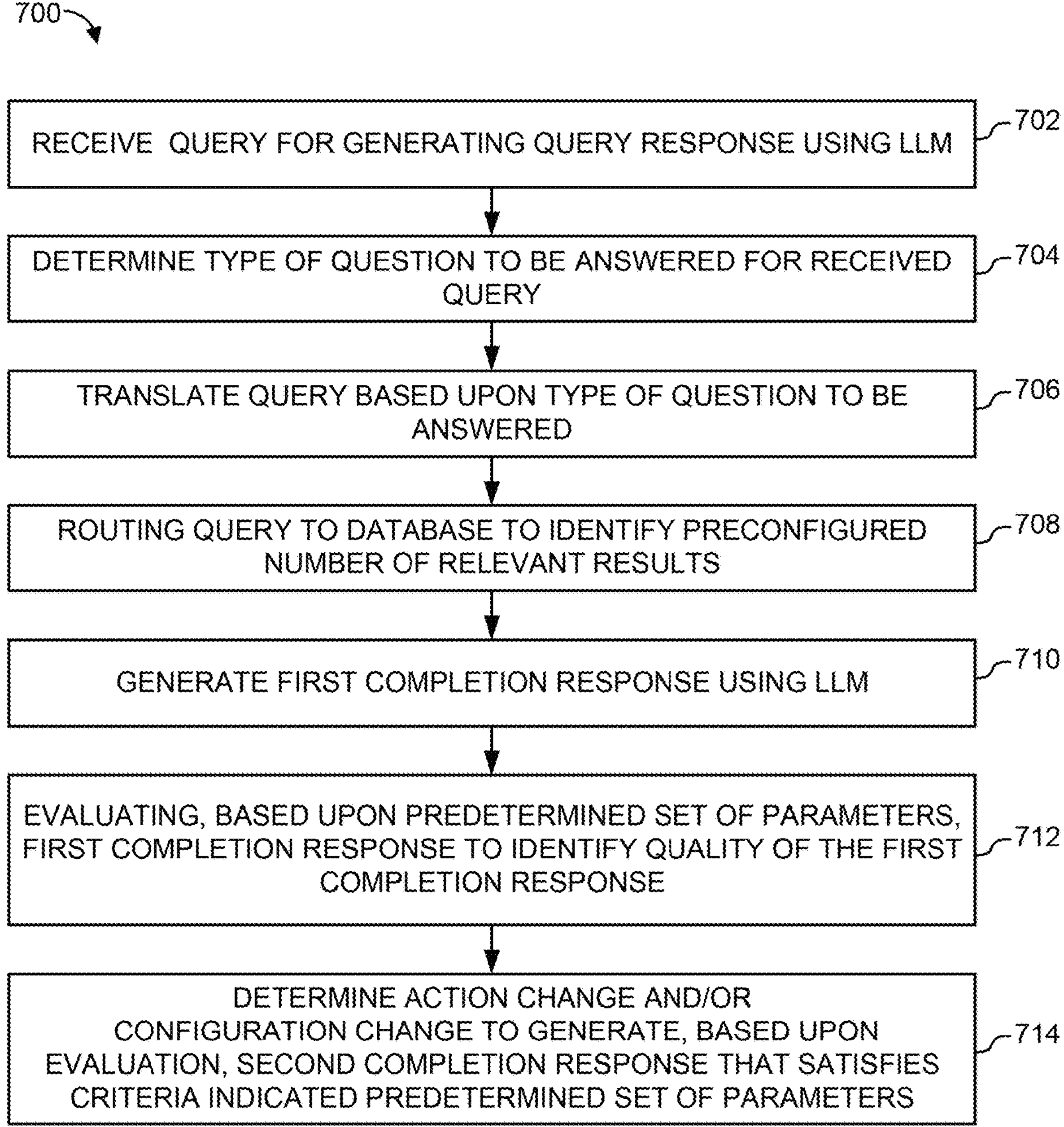
FIG. 7 is a flow diagram that presents an example computer implemented method for generating the query response for the query by integrating adaptive RAG with the LLM, in accordance with implementations of the present disclosure.

FIG. 7 is a flow diagram that presents an example computer implemented method 700 for generating the query response for the query by integrating the adaptive RAG with the LLM 136 (depicted in FIG. 1), in accordance with implementations of the present disclosure. In some implementations, the method 700 may be executed by the processor 138 (including the one or more processors) using the adaptive RAG query engine 142, as described in relation to FIGS. 1-6.

The method 700 includes receiving 702 the query for generating the query response using the LLM 136. Upon receiving the query, the method 700 includes determining 704 a type of question to be answered for the query. In some examples, the type of question to be answered for the received query may be determined based upon an expected answer quality of the query. By way of non-limiting example, the expected answer quality may be one of: a precise answer, a complete answer, an answer with elaborate explanation, and/or a summary answer.

Based upon the type of question to be answered, the method 700 includes translating 706 the query. In some examples, translating the query includes determining an index level required corresponding to the type of question to be answered for the query. The index level may include one of: a sentence level index, a paragraph level index, a page level index, a section level index, and/or a document level index. In some other examples, translating the query may include decomposing the query into sub-queries to generate a completion response corresponding to each of the sub-queries. The query may be decomposed into the sub-queries using techniques such as, step-back prompting, RAG fusion, and/or multi-query approach.

The method 700 includes routing 708 the query to the database 112 to identify a preconfigured number of relevant results. The preconfigured number of relevant results and the database 112 are selected based upon the type of question to be answered. The database 112 may include one of: the relational database 114, the vector database 116, and the graph database 118 (as depicted in FIG. 1). Based upon the preconfigured number of relevant results retrieved from the database 112, the method 700 includes generating 710 a first completion response using the LLM 136.

Once the first completion response is generated, the method 700 includes evaluating 712, based upon a predetermined set of parameters, the first completion response to identify quality of the first completion response. The predetermined set of parameters may indicate criteria such as, expected aspects to be present in the first completion response, an expected answer quality of the first completion response, expectations for elements in the first completion response, and/or the like. For example, the first completion response may be evaluated by identifying a total number of missing expected aspects in the generated first completion response with regards to the received query and/or the type of question to be answered. Evaluation of the first completion response is described in detail in conjunction with FIG. 2 along with the first evaluation module 218, therefore repeated description is omitted for sake of brevity.

When the evaluation of the first completion response indicates that the quality of the first completion response fails to satisfy criteria indicated by the predetermined set of parameters, the method 700 includes determining 714 an action change and/or a configuration change to generate a second completion response that satisfies criteria indicated by the predetermined set of parameters. It should be noted that the second completion response may include one or more completion responses generated subsequently to the first completion response. The action change and/or the configuration change may correspond with retranslating the query, routing retranslated query to the same or different database, regenerating the second completion response, and/or the like.

In some examples, once the second completion response is generated, the method 700 may include comparing the second completion response with the first completion response to determine a progression of the second completion response with regards to the first completion response. Based at least in part upon comparison of the second completion response with the first completion response and based at least in part upon evaluation of the first completion response indicating the quality of the first completion response fails to satisfy the criteria indicated by the predetermined set of parameters, the method 700 may include determining the action change and/or the configuration change to regenerate the second completion response.

In some other examples, once the second completion response is generated, the method 700 may include comparing the second completion response with the first completion response to determine an overlap between the second completion response and the first completion response. Based at least in part upon comparison of the second completion response with the first completion response and based at least in part upon evaluation of the first completion response indicating the quality of the first completion response fails to satisfy the criteria indicated by the predetermined set of parameters, the method 700 may include determining the action change and/or the configuration change to regenerate the second completion response.

In some examples, the method 700 may further include comparing completion responses to determine toggling of answers. The completion responses may be generated during different iterations of generating the completion responses. Based at least in part upon the comparing the completion responses to determine toggling of answers, the method 700 may include determining the action change and/or the configuration change. The action change and/or the configuration change may prevent an additional completion response being generated by performing another iteration.

In some examples, the method 700 may include presenting the first completion response or the second completion response as the query response to the query, by determining whether the first completion response or the second completion response meets or satisfies the criteria indicated by the predetermined set of parameters.

Implementations of the present disclosure provide technical solutions to multiple technical problems that arise in the context of generating the query response for the query using the LLM. Implementations of the present disclosure may provide an adaptive search framework, which enables dynamic determination of the RAG query pipeline for generation of each of one or more completion responses for the query in one or more different iterations. The RAG query pipeline may be dynamically determined after each iteration by determining an action change and/or a configuration change, based on evaluation of a completion response during the respective iteration. The action plan and/or the configuration change may include dynamically selecting a length of relevant results or chunks for the query, dynamically configuring the retrieved results or chunks to create a knowledge base to answer the query, creating an architectural pattern to generate hierarchical index levels for improving retrieval of the relevant results or chunks for the query, and/or the like. Further, among the one or more completion responses, a completion response that satisfies the criteria may be selected as the query response for the query. Therefore, quality or accuracy of the query response may be improved while reducing a number of calls to the LLM, which may reduce computing resource requirements, time, and cost involved in calling the LLM for generating the query response to the query. In addition, the adaptive search framework may allow a user to obtain a more complete response for the query without providing or retyping context again. Therefore, user satisfaction and engagement with the system may be improved.

Further, implementations of the present disclosure may generate the query response for the query with the following advantages:

Dynamic query response synthesis: The query response may be dynamically synthesized using the dynamic RAG query pipeline.

Configuration identification: The RAG query pipeline may be dynamically modified by identifying how each of the modules in the RAG query pipeline contributes to a response generation process.

Iterative refinement: Implementations of the present disclosure may propose iterative refinement mechanism for refining each iteration of response generation by identifying an action change and/or a configuration change. The proposed refinement mechanism may create an adaptive feedback loop, which may contribute to improving overall quality of the query response. Further, the adaptive feedback loop may operate in real-time, dynamically adjusting the configurations of the modules of the RAG query pipeline. Such a dynamic adjustment may allow for immediate response generation to changing contexts or user feedback.

Continuous learning: The adaptive feedback loop may facilitate continuous learning by capturing insights from each iteration of response generation. Such an iterative learning process may contribute to long-term improvement in quality of the query response and performance of the system.

Holistic optimization: Rather than considering solely on re-searching or adjusting specific modules, implementations of the present disclosure may consider a holistic view of the RAG query pipeline (e.g., interplay between the modules and their configurations) to optimize the response generation process for enhanced performance.

Figure 8:
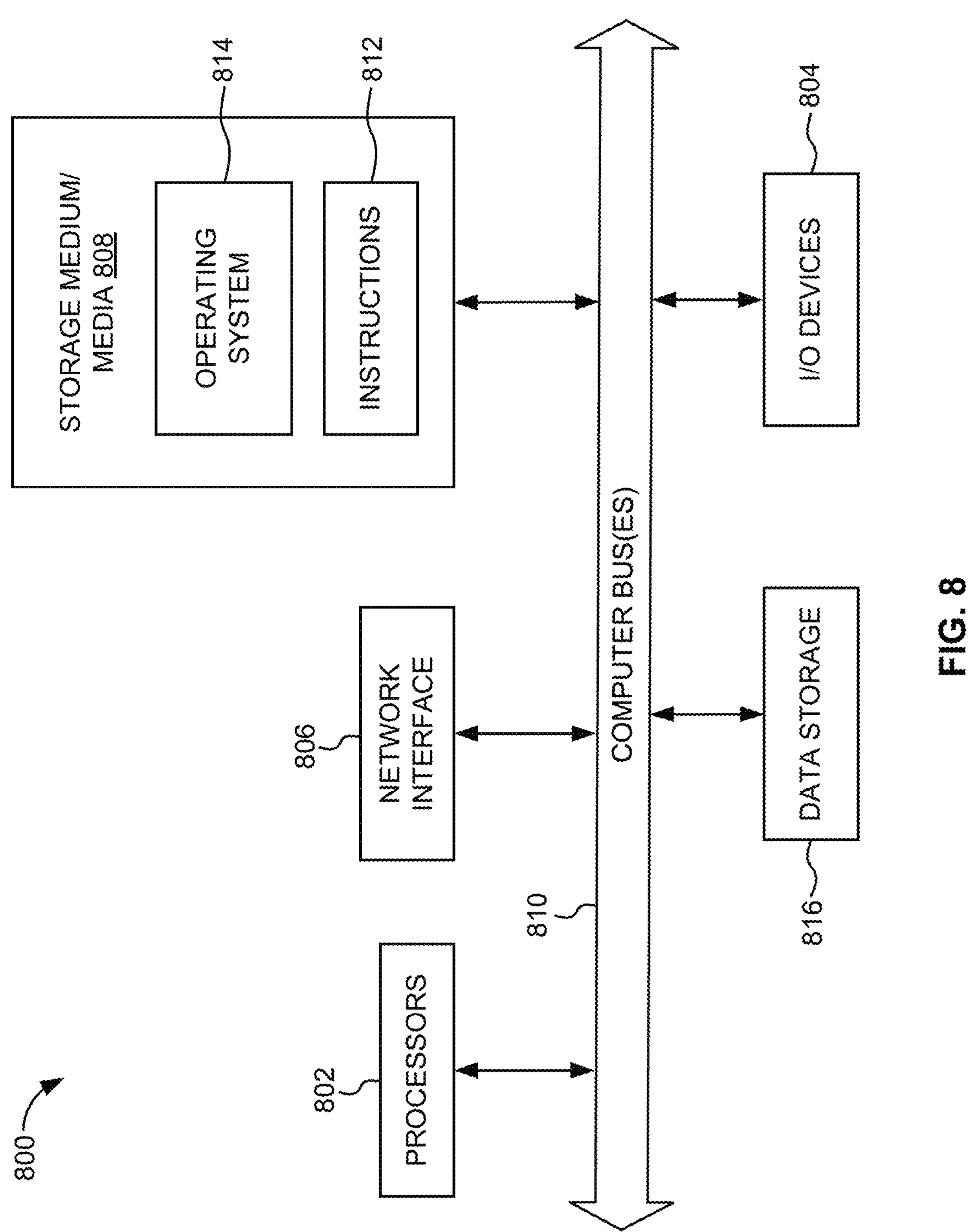
FIG. 8 depicts an example computer system to implement a system disclosed in the adaptive RAG environment of FIG. 1, in accordance with implementations of the present disclosure.

FIG. 8 depicts a computer system 800 that may be used to implement the system 102. More particularly, computing machines such as desktops, laptops, smartphones, tablets, and wearables which may be used to generate the query response for the query by integrating adaptive RAG with the LLM. The computer system 800 may include additional components not shown and that some of the process components described may be removed and/or modified. In another example, a computer system 800 may be deployed on external-cloud platforms such as cloud, internal corporate cloud computing clusters, organizational computing resources, and/or the like.

The computer system 800 includes processor(s) 802 such as, a central processing unit, ASIC or another type of processing circuit, input/output devices 804 such as, a display, mouse keyboard, etc., a network interface 806 such as, a Local Area Network (LAN), a wireless 802.11x LAN, a 3G or 4G mobile WAN or a WiMax WAN, and a storage medium or media 808 (also be referenced to as computer-readable medium (CRM)). Each of these components may be operatively coupled to a bus 810. The computer-readable medium 808 may be any suitable medium that participates in providing instructions to the processor(s) 802 for execution. For example, the computer-readable medium 808 may be non-transitory or non-volatile medium such as, a magnetic disk or solid-state non-volatile memory or volatile medium such as RAM. The instructions or modules stored on the computer-readable medium 808 may include machine-readable instructions 812 executed by the processor(s) 802 that cause the processor(s) 802 to perform the methods and functions of the system 102.

The system 102 may be implemented as software stored on a non-transitory processor-readable medium and executed by the processor(s) 802. For example, the computer-readable medium 808 may store an operating system 814 such as, MAC OS, MS WINDOWS, UNIX, or LINUX, and code, for the system 102. The operating system 814 may be multi-user, multiprocessing, multitasking, multithreading, real-time, and the like. For example, during runtime, the operating system 814 is running and the code for the system 102 is executed by the processor(s) 802.

The computer system 800 may include a data storage 816, which may include non-volatile data storage. The data storage 816 stores any data used or generated by the system 102.

The network interface 806 connects the computer system 800 to internal systems for example, via a LAN. Also, the network interface 806 may connect the computer system 800 to the Internet. For example, the computer system 800 may connect to web browsers and other external applications and systems via the network interface 806.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random-access memory or both. Elements of a computer may include a processor for performing instructions and one or more memory devices for storing instructions and data. Generally, a computer also includes or is operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor(s) 802 and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for generating a query response for a query using dynamic adaptive retrieval-augmented generation (RAG) pipeline comprising:

receiving, by at least one computing device, the query for generating the query response using a large language model (LLM);

determining, by one or more processors of the at least one computing device, a type of question to be answered for the received query;

converting, by the one or more processors, the query into a machine-readable format that is interpreted and executed by a database;

translating, by the one or more processors, the query based upon the type of question to be answered, wherein translating the query comprises determining an index level from different index levels corresponding to the type of question to be answered for the query, wherein the index level is one of: a sentence level index, a paragraph level index, a page level index, and/or a document level index;

routing, by the one or more processors, the query to the database to identify a preconfigured number of relevant results, wherein the preconfigured number of relevant results and the database are selected based upon the type of question to be answered;

generating, by the one or more processors, a first completion response for the query in a first iteration, by processing the query and the preconfigured number of relevant results retrieved from the database using the LLM;

evaluating, by the one or more processors, and based upon a predetermined set of parameters, the first completion response to identify quality of the first completion response;

determining, by the one or more processors, the quality of the first completion response fails to satisfy criteria indicated by the predetermined set of parameters or a quality score assigned for the first completion response is less than or equal to a predetermined quality threshold;

iteratively modifying, by the one or more processors, the RAG pipeline by determining an action change and/or a configuration change based on the quality of the first completion response, wherein the RAG pipeline is modified by:

reconfiguring a search indexing module to dynamically select the index level from the different index levels for retrieving the relevant results for the query, independent of a relationship between the different index levels, and selecting, a subset of modules from a plurality of modules of the RAG pipeline, and disabling, unselected modules among the plurality of modules to generate a second completion response, based on the quality of the first completion response; and generating, by the one or more processors, the second completion response using the modified RAG pipeline for the query and the preconfigured number of relevant results retrieved from the database in a second iteration using the LLM, wherein the second completion response satisfies criteria indicated by the predetermined set of parameters.

2. The computer-implemented method of claim 1, further comprising:

comparing, by the one or more processors, the second completion response with the first completion response to determine a progression of the second completion response with regards to the first completion response; and determining, by the one or more processors, based at least in part upon comparison of the second completion response with the first completion response and based at least in part upon evaluation of the first completion response indicating the quality of the first completion response fails to satisfy criteria indicated by the predetermined set of parameters, the action change and/or the configuration change to regenerate the second completion response.

3. The computer-implemented method of claim 1, further comprising:

comparing, by the one or more processors, the second completion response with the first completion response to determine an overlap between the second completion response and the first completion response; and determining, by the one or more processors, based at least in part upon comparison of the second completion response with the first completion response and based at least in part upon evaluation of the first completion response indicating the quality of the first completion response fails to satisfy criteria indicated by the predetermined set of parameters, the action change and/or the configuration change to regenerate the second completion response.

4. The computer-implemented method of claim 1, further comprising:

comparing, by the one or more processors, a plurality of completion responses to determine toggling of answers, wherein each completion response of the plurality of completion responses is generated during a different iteration of a plurality of iterations of generating the plurality of completion responses; and determining, by the one or more processors, based at least in part upon the comparing, the action change and/or the configuration change.

5. The computer-implemented method of claim 4, wherein the action change and/or the configuration change prevents an additional completion response being generated by performing another iteration of the plurality of iterations.

6. The computer-implemented method of claim 1, wherein the action change and/or the configuration change correspond with retranslating the query, routing the retranslated query to a same or a different database, and/or regenerating the second completion response.

7. The computer-implemented method of claim 1, wherein translating the query comprises decomposing the query into a plurality of sub-queries to generate a completion response corresponding to each of the plurality of sub-queries.

8. The computer-implemented method of claim 7, wherein the plurality of sub-queries is generated using step-back prompting, RAG fusion, and/or a multi-query approach.

9. The computer-implemented method of claim 1, wherein evaluating the first completion response comprises identifying a total number of missing aspects in the generated first completion response with regards to the received query and/or the type of question to be answered.

10. The computer-implemented method of claim 1, further comprising presenting, by the one or more processors, the first completion response or the second completion response as the query response to the query upon determining whether the first completion response or the second completion response meets criteria indicated by the predetermined set of parameters.

11. The computer-implemented method of claim 1, wherein the type of question to be answered for the received query is determined based upon an expected answer quality of the query response, wherein the expected answer quality is one of: a precise answer, a complete answer, an answer with elaborate explanation, and/or a summary answer.

12. The computer-implemented method of claim 1, wherein the database includes one or more of: a relational database, a graph database, and/or a vector database.

13. The computer-implemented method of claim 1, wherein the action plan and/or the configuration change includes dynamically selecting a length of relevant results or chunks for the query, dynamically configuring the retrieved results or chunks to create a knowledge base to answer the query, creating an architectural pattern to generate hierarchical index levels.

14. A system for generating a query response for a query using dynamic adaptive retrieval-augmented generation (RAG) pipeline comprising:

at least one memory storing instructions; and at least one processor communicatively coupled with the at least one memory and configured to execute the stored instructions, wherein the instructions, when executed by the at least one processor, cause the at least one processor to perform operations comprising:

receiving the query for generating the query response using a large language model (LLM);

determining a type of question to be answered for the received query;

converting, the query into a machine-readable format that is interpreted and executed by a database;

translating the query based upon the type of question to be answered, wherein translating the query comprises determining an index level from different index levels corresponding to the type of question to be answered for the query, wherein the index level is one of: a sentence level index, a paragraph level index, a page level index, and/or a document level index;

routing the query to the database to identify a preconfigured number of relevant results, wherein the preconfigured number of relevant results and the database are selected based upon the type of question to be answered;

generating a first completion response for the query in a first iteration, by processing the query and the preconfigured number of relevant results retrieved from the database using the LLM;

evaluating, based upon a predetermined set of parameters, the first completion response to identify quality of the first completion response;

determining, the quality of the first completion response fails to satisfy criteria indicated by the predetermined set of parameters or a quality score assigned for the first completion response is less than or equal to a predetermined quality threshold;

iteratively modifying, the RAG pipeline by determining an action change and/or a configuration change based on the quality of the first completion response, wherein the RAG pipeline is modified by:

reconfiguring a search indexing module to dynamically select the index level from the different index levels for retrieving the relevant results for the query, independent of a relationship between the different index levels, and selecting, a subset of modules from a plurality of modules of the RAG pipeline, and disabling, unselected modules among the plurality of modules to generate a second completion response, based on the quality of the first completion response; and generating, the second completion response using the modified RAG pipeline for the query and the preconfigured number of relevant results retrieved from the database in a second iteration using the LLM, wherein the second completion response satisfies criteria indicated by the predetermined set of parameters.

15. The system of claim 14, wherein the operations further comprise:

comparing the second completion response with the first completion response to determine a progression of the second completion response with regards to the first completion response and/or to determine an overlap between the second completion response and the first completion response; and determining, based at least in part upon comparison of the second completion response with the first completion response and based at least in part upon evaluation of the first completion response indicating the quality of the first completion response fails to satisfy criteria indicated by the predetermined set of parameters, the action change and/or the configuration change to regenerate the second completion response.

16. The system of claim 14, wherein the operations further comprise:

comparing a plurality of completion responses to determine toggling of answers, wherein each completion response of the plurality of completion responses is generated during a different iteration of a plurality of iterations generating the plurality of completion responses; and determining, based at least in part upon the comparing, the action change and/or the configuration change, wherein the action change and/or the configuration change prevents an additional completion response being generated by performing another iteration of the plurality of iterations, and wherein the action change and/or the configuration change correspond with retranslating the query, routing the retranslated query to a same or a different database, and/or regenerating the second completion response.

17. The system of claim 14, wherein translating the query comprises:

decomposing the query into a plurality of sub-queries to generate a completion response corresponding to each of the plurality of sub-queries, wherein the plurality of sub-queries is generated using step-back prompting, RAG fusion, and/or a multi-query approach.

18. The system of claim 14, wherein evaluating the first completion response comprises identifying a total number of missing aspects in the generated first completion response with regards to the received query and/or the type of question to be answered.

19. The system of claim 14, wherein the operations further comprise presenting the first completion response or the second completion response as a response to the query upon determining whether the first completion response or the second completion response meets criteria indicated by the predetermined set of parameters.

20. A non-transitory computer-readable media (CRM) having instructions stored thereon, which when executed by at least one processor of at least one computing device, to generate a query response for a query using dynamic adaptive retrieval-augmented generation (RAG) pipeline by performing operations comprising:

receiving a query for generating the query response using the large language model (LLM);

determining a type of question to be answered for the received query;

converting, the query into a machine-readable format that is interpreted and executed by a database;

translating the query based upon the type of question to be answered, wherein translating the query comprises determining an index level from different index levels corresponding to the type of question to be answered for the query, wherein the index level is one of: a sentence level index, a paragraph level index, a page level index, and/or a document level index;

routing the query to the database to identify a preconfigured number of relevant results, wherein the preconfigured number of relevant results and the database are selected based upon the type of question to be answered;

generating a first completion response for the query in a first iteration, by processing the query and the preconfigured number of relevant results retrieved from the database using the LLM;

evaluating, based upon a predetermined set of parameters, the first completion response to identify quality of the first completion response;

determining, the quality of the first completion response fails to satisfy criteria indicated by the predetermined set of parameters or a quality score assigned for the first completion response is less than or equal to a predetermined quality threshold;

iteratively modifying, the RAG pipeline by determining an action change and/or a configuration change based on the quality of the first completion response, wherein the RAG pipeline is modified by:

reconfiguring a search indexing module to dynamically select the index level from the different index levels for retrieving the relevant results for the query, independent of a relationship between the different index levels, and selecting, a subset of modules from a plurality of modules of the RAG pipeline, and disabling, unselected modules among the plurality of modules to generate a second completion response, based on the quality of the first completion response; and generating, the second completion response using the modified RAG pipeline for the query and the preconfigured number of relevant results retrieved from the database in a second iteration using the LLM, wherein the second completion response satisfies criteria indicated by the predetermined set of parameters.

* * * * *